US008649789B2

(12) United States Patent
Shi et al.

(10) Patent No.: US 8,649,789 B2
(45) Date of Patent: Feb. 11, 2014

(54) METHOD AND APPARATUS FOR SWITCHING VIRTUAL SIM SERVICE CONTRACTS WHEN ROAMING

(75) Inventors: Guangming Shi, San Diego, CA (US); Venkat Tangirala, San Diego, CA (US); Ta-yan Siu, San Diego, CA (US); Julian Durand, San Diego, CA (US); Stephen A. Sprigg, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 423 days.

(21) Appl. No.: 12/480,490

(22) Filed: Jun. 8, 2009

(65) Prior Publication Data

US 2010/0311418 A1    Dec. 9, 2010

(51) Int. Cl.
*H04W 4/00*      (2009.01)
*H04B 1/38*      (2006.01)

(52) U.S. Cl.
USPC ............ 455/432.3; 455/432.1; 455/558

(58) Field of Classification Search
USPC ............ 455/432.3, 432.1, 558, 433, 408, 419
See application file for complete search history.

(56) References Cited

U.S. PATENT DOCUMENTS

| | | | |
|---|---|---|---|
| 5,428,666 A | 6/1995 | Fyfe et al. | |
| 5,763,862 A | 6/1998 | Jachimowicz et al. | |
| 5,987,325 A | 11/1999 | Tayloe | |
| 6,078,652 A | 6/2000 | Barak | |
| 6,212,372 B1 | 4/2001 | Julin | |
| 6,490,679 B1 | 12/2002 | Tumblin et al. | |
| 6,526,272 B1 | 2/2003 | Bansal et al. | |
| 6,643,504 B1 | 11/2003 | Chow et al. | |
| 6,829,593 B1 | 12/2004 | Ritter et al. | |
| 6,914,517 B2 | 7/2005 | Kinsella | |
| 7,039,221 B1 | 5/2006 | Tumey et al. | |
| 7,171,460 B2 | 1/2007 | Kalavade et al. | |
| 7,185,161 B2 | 2/2007 | Kang | |
| 7,218,930 B2 | 5/2007 | Ko et al. | |
| 7,593,605 B2 | 9/2009 | King et al. | |
| 7,676,222 B1 | 3/2010 | Helaine et al. | |
| 7,689,231 B2 | 3/2010 | Mardiks et al. | |
| 7,689,251 B2 | 3/2010 | Bae | |
| 7,738,891 B2 | 6/2010 | Tenhunen et al. | |
| 7,787,602 B2 | 8/2010 | Pearson et al. | |

(Continued)

FOREIGN PATENT DOCUMENTS

| | | |
|---|---|---|
| CN | 1482568 A | 3/2004 |
| DE | 29821644 | 2/1999 |

(Continued)

OTHER PUBLICATIONS

International Search Report and Written Opinion—PCT/US2010/037803, International Search Authority—European Patent Office—Feb. 12, 2010.

(Continued)

*Primary Examiner* — Jinsong Hu
*Assistant Examiner* — Jean Chang
(74) *Attorney, Agent, or Firm* — James T. Hagler

(57) ABSTRACT

A system and method store provisioning data supporting a plurality of service providers in a VSIM internal memory unit of a mobile device. The mobile device may automatically enable provisioning data supporting one of the plurality of service providers stored in the VSIM internal memory unit to conduct a wireless communication so as to avoid roaming fees.

18 Claims, 15 Drawing Sheets

(56) References Cited

U.S. PATENT DOCUMENTS

| | | |
|---|---|---|
| 2001/0044900 A1 | 11/2001 | Uchida |
| 2002/0072388 A1 | 6/2002 | Korneluk et al. |
| 2002/0095588 A1 | 7/2002 | Shigematsu et al. |
| 2002/0097855 A1 | 7/2002 | Neudeck et al. |
| 2002/0103964 A1 | 8/2002 | Igari |
| 2003/0046228 A1 | 3/2003 | Berney |
| 2003/0054800 A1 | 3/2003 | Miyashita |
| 2003/0083968 A1 | 5/2003 | Marsh et al. |
| 2003/0191939 A1 | 10/2003 | Tsai et al. |
| 2004/0022216 A1 | 2/2004 | Shi |
| 2004/0024670 A1 | 2/2004 | Valenzuela et al. |
| 2004/0039930 A1 | 2/2004 | Ohmori et al. |
| 2004/0050930 A1 | 3/2004 | Rowe |
| 2004/0087305 A1 | 5/2004 | Jiang et al. |
| 2004/0172541 A1 | 9/2004 | Ando et al. |
| 2004/0204051 A1 | 10/2004 | Scott et al. |
| 2004/0215968 A1 | 10/2004 | Rodwell et al. |
| 2004/0249915 A1 | 12/2004 | Russell |
| 2005/0020250 A1 | 1/2005 | Chaddha et al. |
| 2005/0039027 A1 | 2/2005 | Shapiro |
| 2005/0079863 A1* | 4/2005 | Macaluso ............... 455/419 |
| 2005/0101323 A1 | 5/2005 | De Beer |
| 2005/0124288 A1 | 6/2005 | Karmi et al. |
| 2005/0191998 A1 | 9/2005 | Onyon et al. |
| 2005/0193198 A1 | 9/2005 | Livowsky |
| 2005/0282554 A1 | 12/2005 | Shyy et al. |
| 2006/0068786 A1 | 3/2006 | Florence |
| 2006/0079237 A1 | 4/2006 | Liu et al. |
| 2006/0160532 A1* | 7/2006 | Buckley et al. ......... 455/422.1 |
| 2006/0172772 A1 | 8/2006 | Bjorkner |
| 2006/0181521 A1 | 8/2006 | Perreault et al. |
| 2006/0218337 A1 | 9/2006 | Hashimoto |
| 2006/0234693 A1 | 10/2006 | Isidore et al. |
| 2006/0282554 A1 | 12/2006 | Jiang et al. |
| 2006/0285538 A1 | 12/2006 | Oommen |
| 2006/0285663 A1 | 12/2006 | Rathus et al. |
| 2006/0291455 A1 | 12/2006 | Katz et al. |
| 2007/0060200 A1 | 3/2007 | Boris et al. |
| 2007/0094337 A1 | 4/2007 | Klassen et al. |
| 2007/0105531 A1 | 5/2007 | Schroeder, Jr. |
| 2007/0130156 A1 | 6/2007 | Tenhunen et al. |
| 2007/0149170 A1 | 6/2007 | Bloebaum et al. |
| 2007/0178895 A1 | 8/2007 | Bot |
| 2007/0202895 A1 | 8/2007 | Benco et al. |
| 2007/0206838 A1 | 9/2007 | Fouquet |
| 2007/0218947 A1 | 9/2007 | Buckley |
| 2007/0223031 A1 | 9/2007 | Kitada et al. |
| 2007/0238449 A1 | 10/2007 | Park et al. |
| 2007/0254713 A1 | 11/2007 | Lagnado et al. |
| 2007/0255797 A1 | 11/2007 | Dunn et al. |
| 2008/0020755 A1* | 1/2008 | Liu et al. ................ 455/432.1 |
| 2008/0020773 A1 | 1/2008 | Black et al. |
| 2008/0028230 A1 | 1/2008 | Shatford |
| 2008/0051062 A1 | 2/2008 | Lee |
| 2008/0072299 A1 | 3/2008 | Reiher |
| 2008/0087720 A1 | 4/2008 | Levitov |
| 2008/0120504 A1 | 5/2008 | Kirkup et al. |
| 2008/0209545 A1 | 8/2008 | Asano |
| 2008/0223925 A1 | 9/2008 | Saito et al. |
| 2008/0254766 A1 | 10/2008 | Craven |
| 2008/0265024 A1 | 10/2008 | Tracy et al. |
| 2008/0289018 A1 | 11/2008 | Kawaguchi |
| 2008/0290161 A1 | 11/2008 | Blake |
| 2008/0311912 A1 | 12/2008 | Balasubramanian |
| 2009/0007250 A1 | 1/2009 | Pouzin et al. |
| 2009/0019528 A1 | 1/2009 | Wei et al. |
| 2009/0037207 A1 | 2/2009 | Farah |
| 2009/0061839 A1 | 3/2009 | Zimmerman et al. |
| 2009/0077643 A1 | 3/2009 | Schmidt et al. |
| 2009/0108988 A1 | 4/2009 | Cleveland et al. |
| 2009/0163175 A1 | 6/2009 | Shi et al. |
| 2009/0191846 A1 | 7/2009 | Shi |
| 2009/0215449 A1* | 8/2009 | Avner ...................... 455/433 |
| 2009/0227230 A1* | 9/2009 | Camilleri et al. ......... 455/408 |
| 2010/0005313 A1 | 1/2010 | Dai |
| 2010/0112997 A1 | 5/2010 | Roundtree |
| 2010/0167724 A1* | 7/2010 | Haran et al. ............... 455/432.3 |
| 2010/0234009 A1 | 9/2010 | Antani et al. |
| 2010/0248690 A1 | 9/2010 | Biggs et al. |
| 2010/0279653 A1 | 11/2010 | Poltorak |
| 2010/0291924 A1* | 11/2010 | Antrim et al. ................. 455/433 |
| 2010/0311391 A1 | 12/2010 | Siu et al. |
| 2010/0311402 A1 | 12/2010 | Srinivasan et al. |
| 2010/0311404 A1 | 12/2010 | Shi et al. |
| 2010/0311444 A1 | 12/2010 | Shi et al. |
| 2010/0311468 A1 | 12/2010 | Shi et al. |
| 2011/0028135 A1 | 2/2011 | Srinivasan |
| 2011/0059738 A1 | 3/2011 | Waller |

FOREIGN PATENT DOCUMENTS

| | | |
|---|---|---|
| DE | 10146664 | 2/2003 |
| EP | 1012716 A1 | 6/2000 |
| EP | 1337119 A1 | 8/2003 |
| EP | 1638357 A1 | 3/2006 |
| EP | 1696357 | 8/2006 |
| EP | 1727383 | 11/2006 |
| EP | 2076071 | 7/2009 |
| GB | 2313257 | 11/1997 |
| GB | 2386803 | 9/2003 |
| JP | 4352548 A | 12/1992 |
| JP | H06284182 A | 10/1994 |
| JP | 3048638 B2 | 6/2000 |
| JP | 2000259820 A | 9/2000 |
| JP | 2002095038 A | 3/2002 |
| JP | 2002511968 A | 4/2002 |
| JP | 2002197186 A | 7/2002 |
| JP | 2002218536 A | 8/2002 |
| JP | 2002297257 A | 10/2002 |
| JP | 2002297552 A | 10/2002 |
| JP | 2003091509 A | 3/2003 |
| JP | 2003264631 | 9/2003 |
| JP | 2004134825 A | 4/2004 |
| JP | 2004178141 A | 6/2004 |
| JP | 2004206412 A | 7/2004 |
| JP | 2004220175 A | 8/2004 |
| JP | 2006054692 A | 2/2006 |
| JP | 2006114992 A | 4/2006 |
| JP | 2006121336 A | 5/2006 |
| JP | 2006121280 A | 8/2006 |
| JP | 2006295382 A | 10/2006 |
| JP | 2007200367 A | 8/2007 |
| JP | 2008518364 A | 5/2008 |
| JP | 2009514320 A | 4/2009 |
| JP | 2009542149 A | 11/2009 |
| KR | 20080021178 A | 3/2008 |
| KR | 20080100255 A | 11/2008 |
| RU | 2169437 C1 | 6/2001 |
| RU | 2300852 C2 | 6/2007 |
| WO | WO9219078 | 10/1992 |
| WO | WO9924938 | 5/1999 |
| WO | WO9946682 | 9/1999 |
| WO | WO0111577 | 2/2001 |
| WO | WO0162029 A1 | 8/2001 |
| WO | WO02067563 | 8/2002 |
| WO | WO03007639 A1 | 1/2003 |
| WO | 03107112 A2 | 12/2003 |
| WO | WO2004028191 A1 | 4/2004 |
| WO | WO2005029890 | 3/2005 |
| WO | WO2006047764 A2 | 5/2006 |
| WO | WO2006094564 | 9/2006 |
| WO | WO2007049856 A1 | 5/2007 |
| WO | 2007092099 A1 | 8/2007 |
| WO | WO2007143342 | 12/2007 |
| WO | WO2008040964 | 4/2008 |
| WO | 2008093671 A1 | 8/2008 |

OTHER PUBLICATIONS

Partial International Search Report—PCT/US2010/037803—International Search Authority, European Patent Office, Oct. 4, 2010.

* cited by examiner

151 ▲

| SID | Selection Preference | Roaming Indicator | Acquisition Index |
|---|---|---|---|
| Home System (SID) | First | Off | 0 |
| Roaming Partner 1 (SID) | Second | Off | 1 |
| Roaming Partner 2 (SID) | Third | Off | 2 |
| Roaming Partner 3 (SID) | Fourth | On | 3 |

152 ▲

| Acquisition Index | Acquisition Type | Blocks/Channel |
|---|---|---|
| 0 | PCS CDMA Blocks | B |
| 1 | PCS CDMA Blocks | A |
| 2 | PCS CDMA Channels | 283 699 384 777 |
| 3 | Cellular Analog | On |

Fig. 4

METHOD AND APPARATUS FOR SWITCHING VIRTUAL SIM SERVICE CONTRACTS WHEN ROAMING

RELATED APPLICATION DATA

This application is related to U.S. patent application Ser. No. 12/480,319, entitled "Virtual SIM for Mobile Handsets;" U.S. patent application Ser. No. 12/480,406, entitled "Method and Apparatus for Switching Virtual SIM Service Contracts Based Upon a User Profile;" and U.S. patent application Ser. No. 12/480,453, entitled "Method and apparatus for Updating the Rules Governing the Switching of a Virtual SIM service contract;" each of which is being filed concurrently with the instant application and each of whose contents is hereby incorporated by reference in its entirety.

FIELD OF INVENTION

The present invention relates generally to cellular telephone technologies, and more particularly to a system and method for switching cellular telephone provisioning information whenever a roaming condition is detected.

BACKGROUND OF INVENTION

Presently, mobile devices utilize a variety of technologies and formats which may include, for example, GSM (Global System for Mobile Communication), CDMA (Code Division Multiple Access) and/or UMTS (Universal Mobile Telecommunications System) technologies depending on the service provider of choice. In order to store the necessary provisioning data which allows the mobile device to communicate with a wireless communications network, GSM and UMTS mobile devices utilize a Subscriber Identity Module (SIM), commonly known as a SIM card. The SIM card is a detachable smart card containing the mobile device provisioning data, as well as a wealth of personal data, such as phonebooks, saved SMS messages, downloaded data, and personalization settings. Because the SIM card is detachable, multiple SIM cards with alternative provisioning information may be interchangeably inserted into the mobile device. In this manner, GSM and UMTS mobile devices may be used internationally simply by inserting a SIM card with the appropriate local provisioning information. By carrying multiple SIM cards each containing the provisioning information of a different service provider, a user may switch service providers simply by physically switching SIM cards. In addition, the interchangeable aspect of SIM cards allows a user to purchase limited term pre-paid SIM cards. Limited term pre-paid SIM cards provide a user with access to a communication network so long as the pre-paid SIM card account remains valid. This option allows a user to essentially maintain service contracts with a wide variety of service providers as opposed to the conventional manner of maintaining a service contract with a single service provider. This allows a user to access a multitude of communication networks.

The limited term pre-paid SIM card option is particularly useful, for example, to international travelers who desire access to local wireless communication networks for the duration of their travels, but do not require additional access to local wireless communication networks after their return home. However, since the user's personal SIM card is replaced with the pre-paid SIM card during travel, the user cannot access personal data stored on their personal SIM card. This may cause frustration to the user as personal data such as contact data stored in the phone book on the personal SIM is no longer accessible while the pre-paid SIM card is in use. In addition, if the user travels out of the region for which the pre-paid SIM card provides wireless communication network access, the user must purchase a different pre-paid SIM card with the appropriate provisioning data for the new region. As a result, a user may have to carry a number of different pre-paid SIM cards and keep track of which pre-paid SIM card contains the appropriate provisioning data for each region.

While analogous devices for other mobile network systems have been developed, such as the Removable User Identity Module (RUIM), Universal Subscriber Identity Module (USIM) or Universal Integrated Circuit Card (UICC) (referred to herein as "smart cards"), these devices suffer from the same problems of personal data loss when the RUIM, USIM or UICC is removed in favor of a pre-paid locally provisioned smart card.

While some CDMA mobile devices store provisioning information on a removable card that can be moved from mobile device to mobile device, many CDMA phones do not provide this capability. Thus, many CDMA device users are not afforded the option of utilizing their personal mobile device when traveling abroad. Typically, these users must rent a mobile device or purchase a disposable device which has been provisioned for local use or that may accept a SIM card.

Still other non-international traveling users may find the ability to quickly access the wireless communication networks of multiple service providers appealing. A typical mobile device user subscribes to a single service provider for wireless communication service for a relatively long term contract. A user may select a service provider based on a number of considerations including, but not limited to cost, network coverage and services available. While service providers may excel in certain aspects they may fail in other aspects. A user may need to make tradeoffs when selecting a single service provider. By utilizing SIM cards, a user is no longer constrained to a single service provider. A user may select a service provider to use based upon which service provider will provide the optimal service for the user's specific need. Then the user may simply replace the current SIM card with the SIM card of the desired service provider on a per usage basis. For example, suppose service provider A provides excellent network coverage for voice communication on the east coast but not on the west coast, and provides slow data services. While on the east coast and conducting voice calls a user may elect to insert the SIM card for service provider A. However, if the user travels to the west coast or wishes to conduct a data call, the user may elect to replace service provider A's SIM card with another service provider's SIM card. In this manner, a user may optimize wireless communication services, but must keep track of and carry multiple physical SIM cards.

Consequently, a system and method is desired to allow users to more easily modify the provisioning data according to location, usage, and/or time.

SUMMARY

In various embodiments a system and method is provided for modifying the provisioning data contained within the memory of mobile devices. Provisioning data is stored within a virtual SIM (VSIM) card which may be contained as part of the mobile device's internal memory. The provisioning data for multiple service providers may be stored within a VSIM and may be selectively enabled and disabled so as to avoid roaming fees. An embodiment provides the mobile device with the provisioning data for a new service provider in the event that all current service providers would be in a roaming condition.

BRIEF DESCRIPTION OF THE DRAWINGS

The accompanying drawings, which are incorporated herein and constitute part of this specification, illustrate embodiments of the invention, and, together with the general description given above and the detailed description given below, serve to explain features of the invention.

FIG. 4 is a system and acquisition table of an exemplary preferred roaming list (PRL).

DETAILED DESCRIPTION

Figure 1:
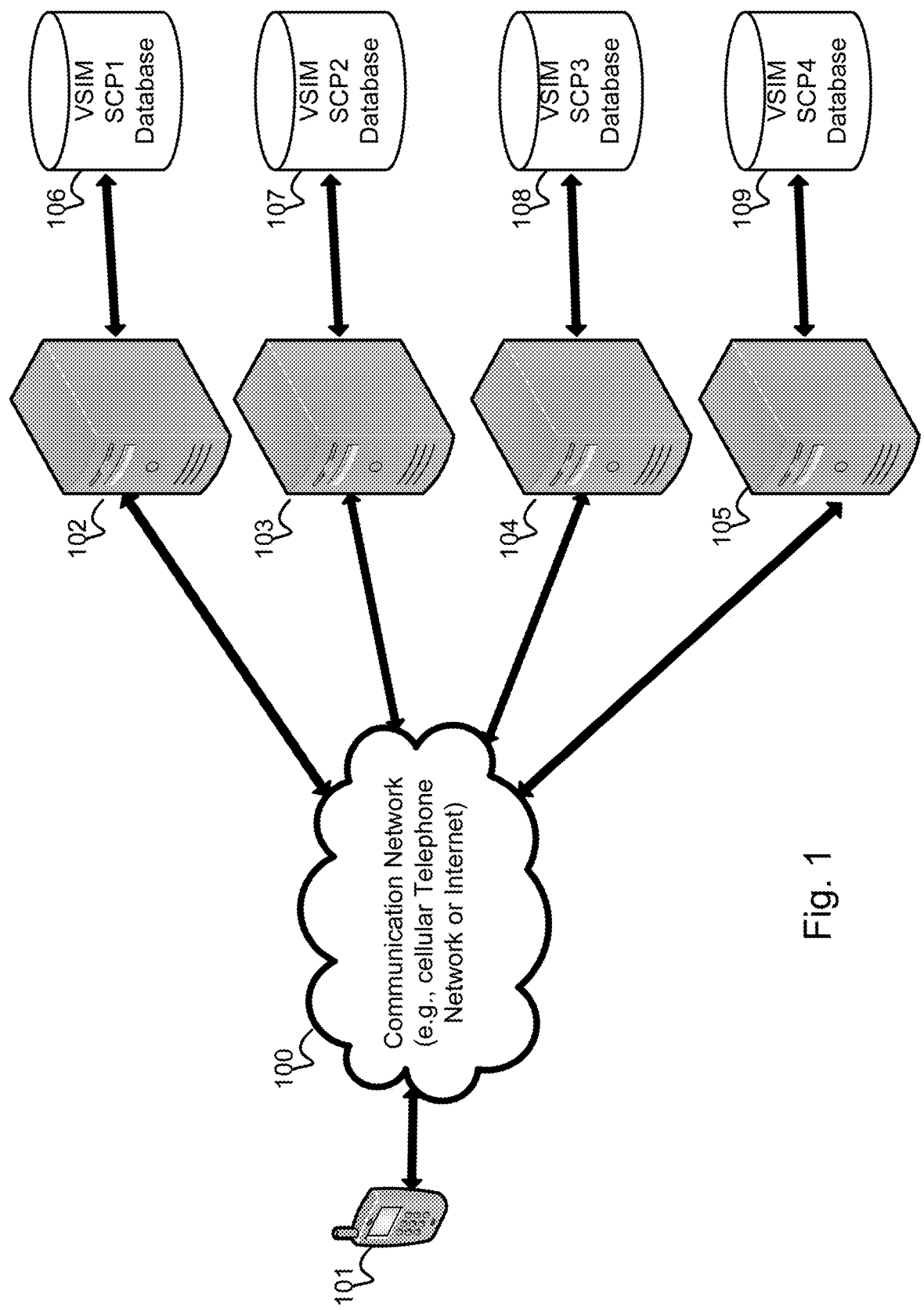
FIG. 1 is a system diagram illustrating an embodiment system which provides for virtual SIM (VSIM) service contracts.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the term mobile device may refer to any one or all of cellular telephones, personal data assistants (PDA's), palm-top computers, laptop computers, wireless electronic mail receivers (e.g., the Blackberry® and Treo® devices), multimedia Internet enabled cellular telephones (e.g., the iPhone®), and similar personal electronic devices which include a programmable processor and memory. In a preferred embodiment, the mobile device is a cellular handset that can communicate via a cellular telephone network (e.g., a cellphone).

As used herein, the term "server" refers to any of a variety of commercially available computer systems configured to operate in a client-server architecture. In particular, the term "server" refers to network servers, particularly Internet accessible servers, which typically include a processor, memory (e.g., hard disk memory), and network interface circuitry configured to connect the server processor to the network, such as the Internet or a cellular telephone network.

Recently, some users of mobile device have begun to subscribe to multiple service providers for service so that they may use different service providers for different purposes. These users store the provisioning data for the different service contracts on SIM cards and simply interchange the SIM card containing the desired provisioning data. Additionally, alternative service provider contracts have become available to users of mobile devices. Rather than requiring users to commit to long term service contracts where users maintain a monthly account with a single service provider, short term pre-paid service contracts are available to users from a variety of service providers which allow users to access the service provider's communications network for a limited duration. Typically, a user using a short term pre-paid service contract (PPSC) will be able to access the communication network for a limited number of minutes, a limited number of bytes of data transferred, or a combination thereof. Once the user has accessed the communication network for the limited number of minutes, transferred the limited number of bytes of data, or both, the short term pre-paid service contract will expire. For sake of simplicity, PPSCs will be discussed herein as being limited in number of minutes only. However, one of skill in the art would appreciate that the embodiments described herein may similarly operate with PPSCs limited in duration (e.g., some number of minutes, days, weeks or months), number of bytes of data transferred or a combination of time, minutes and bytes of data transferred. Traditionally, short term pre-paid service contracts are established through the purchase of Subscriber Identity Module (SIM) cards. Interchangeable SIM cards containing the necessary provisioning data which allow access to a service provider's communication network may be purchased and inserted into a user's mobile device. Once activated, the service provider supporting the short term pre-paid service contract may monitor usage and deny access to the communication network once the service contract expires.

The SIM card is a removable memory chip or smart card used in GSM and UMTS mobile devices to store the necessary provisioning data, such as the service-subscriber key used to identify a mobile device to wireless communication networks, to enable the mobile device to access a particular communication network. User can use different mobile devices by simply removing the SIM card from one mobile device and inserting it into another. A typical low cost SIM card has a small memory, 2-3 KB, which may only be enough to contain provisioning data and perhaps a personal phone directory. Data stored in a SIM card is used by the phone directly. SIM cards with additional applications are available in many storage sizes, the largest being capable of storing up to 1 gigabyte of information. Smaller sized SIM cards, capable of storing up to 32 KB or 16 KB, are the most prevalent in areas with less-developed GSM networks.

The use of a SIM card is mandatory in GSM cellular telephone networks. SIM cards store network specific information used to authenticate and identify subscribers on the network, the most important of which are the ICCID, IMSI, Authentication Key (Ki), and Local Area Identity (LAI). The SIM also stores other carrier specific data such as the SMSC (Short Message Service Centre) number, Service Provider Name (SPN), Service Dialing Numbers (SDN), and Value Added Service (VAS) applications. The equivalent of a SIM card in UMTS cellular telephone networks is called the Universal Integrated Circuit Card (UICC). CDMA phones may contain an analogous Removable User Identity Module (RUIM).

While the portability of SIM cards makes them ideal platforms to distribute PPSCs, their use is not without disadvantage. For example, each of the short term pre-paid service contract SIM cards (pre-paid SIM) are provisioned with a pre-provisioned phone number. Each time a particular pre-paid SIM is inserted into a mobile device, the phone number of the mobile device will change. Consequently, each time the user replaces the pre-paid SIM, callers unaware of the pre-paid SIM replacement will be unable to contact the user's mobile device. In addition, because the pre-paid SIM replaces a user's personal SIM card, the user's personal data stored on the personal SIM card is unavailable to the user while the pre-paid SIM is in use. Also, each pre-paid SIM is typically serviced by a single service provider. If a user desires to utilize the communication network of another service provider, the user must remove the pre-paid SIM card and replace it with another. Thus, if the user travels outside of the region for which a particular SIM card is provisioned for, the user must replace the SIM card with another. This is the case of international travel.

Similarly, if the user wishes to access another service provider's communication network to take advantage of certain superior features, the user must also replace the SIM card with another. For example, some service providers may provide better voice communications while other service providers may provide better data communications. This constant replacement of physical SIM cards can be cumbersome. Not only must the user physically change out the SIM card, the user must also carry a variety of different SIM cards.

The various embodiments alleviate these problems by creating a virtual SIM (VSIM) card capability enabling portions of the mobile device's internal memory to store the provisioning information for a variety of service providers. The VSIM may be implemented on all mobile devices, including GSM, UMTS and CDMA varieties. A user may purchase a VSIM service contract (PPSC or otherwise) from any service provider and download the corresponding provisioning data for that service provider. The provisioning information may be loaded into the VSIM of the mobile device. Moreover, a user may store the provisioning information for multiple service contracts on the VSIM. Thereafter, users may switch service providers merely by setting a user profile to control the switching of service contracts depending on various criteria category values specified by the user. In instances where the user travels from one region to another (i.e., international travel), the user may quickly access and implement the appropriate provisioning information for the region in which the user is currently located. Additionally, it is possible for the user to maintain a constant phone number despite the changes to the implemented provisioning information. In this manner, callers may continue to contact the user's mobile device regardless of which service contract is currently enabled on the VSIM.

FIG. 1 illustrates an overall system of an embodiment wherein each service provider offering a VSIM service contract operates their own VSIM service contract provisioning (SCP) server 102-105. A user may purchase and obtain a VSIM PPSC or a VSIM monthly service contract (MSC) (collectively VSIM service contracts) by connecting to the service provider's VSIM SCP server 102-105 through a communication network 100 to download the appropriate provisioning data to support the desired service contract. The communication network 100 may be, for example, either a cellular telephone network or the Internet. For sake of simplicity, the various embodiments will be described as a mobile device 101 connected to a VSIM SCP server via a cellular telephone network. However, one of skill in the art would appreciate that a user may also connect to a VSIM SCP server via the Internet and subsequently transfer the provisioning data of the SCP to the mobile device VSIM. While FIG. 1 depicts four separate VSIM SCP servers 102-105, the number of VSIM SCP servers will depend on the number of service providers offering VSIM service contracts. The VSIM SCP servers 102-105 may contain internal memory storage units such as a mass storage disc drive, or may be in connection with a corresponding VSIM SCP database 106-109, which are capable of storing the provisioning data and account status for each individual VSIM service contract (PPSC or MSC) operating on the system. Each of VSIM SCP servers 102-105 and VSIM SCP databases 106-109 may be operated by different service providers. Additionally, each VSIM SCP server 102-105 and/or VSIM database 106-109 may offer a variety of service contracts to the user. For example, each VSIM SCP server 102-105 and/or VSIM database 106-109 may offer users either VSIM PPSCs or VSIM MSCs. Additionally, varying VSIM service contracts may provide which voice only services, data only services or a combination thereof.

The various embodiments may be implemented on any of a variety of mobile devices, such as, for example, cellular telephones, personal data assistants (PDA) with cellular telephone, mobile electronic mail receivers, mobile web access devices, and other processor equipped devices that may be developed in the future. In addition, the embodiments described above may be implemented on any of a variety of computing devices, including but not limited to desktop and laptop computers.

Figure 2:
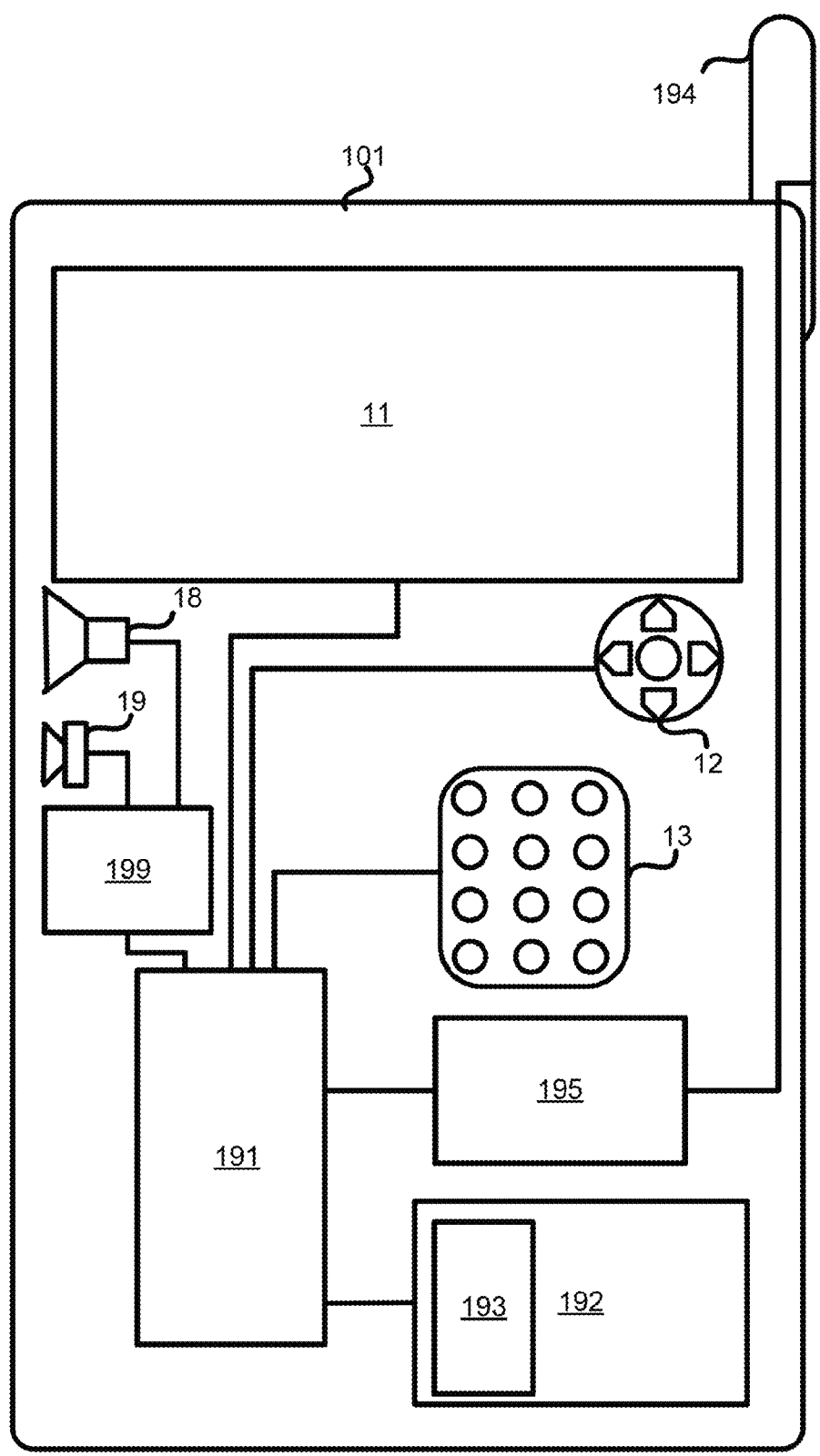
FIG. 2 is a system block diagram of a mobile device suitable for use in an embodiment.

FIG. 2 depicts typical components of a mobile device 101 capable of supporting the various embodiments. A typical mobile device 101 includes a processor 191 coupled to internal memory 192 and a user interface display 11. The internal memory 192 includes a VSIM memory unit 193 which is used to store the provisioning information of a plurality of VSIM PPSC accounts. The VSIM memory unit 193 may be a partition within the mobile device internal memory 192 or may be a separate internal memory unit (i.e., a separate memory chip). In addition, the VSIM memory unit 193 may store personal data downloaded from a VSIM server for use with applications being executed on the mobile device processor 191, as described in further detail below with reference to FIGS. 10 and 11.

The mobile device 101 may include an antenna 194 for sending and receiving electromagnetic radiation that is connected to a wireless data link and/or cellular telephone transceiver 195 coupled to the processor 191. In some implementations, the transceiver 195 and portions of the processor 191 and memory 192 used for cellular telephone communications are referred to as the air interface since the combination provides a data interface via a wireless data link. Further, the mobile device 101 includes a speaker 18 to produce audible sound and a microphone 19 for sensing sound, such as receiving the speech of a user. Both the microphone 19 and speaker 18 may be connected to the processor 191 via a vocoder 199 which transforms analog electrical signals received from the microphone 19 into digital codes, and transform digital codes received from the processor 191 into analog electrical signals which the speaker 18 can transform into sound waves. In some implementations, the vocoder 199 may be included as part of the circuitry and programming of the processor 191.

The processor 191 may be any programmable microprocessor, microcomputer or multiple processor chip or chips that can be configured by software instructions (applications) to perform a variety of functions, including the functions of the various embodiments described below. In some mobile devices, multiple processors 191 may be provided, such as one processor dedicated to wireless communication functions and one processor dedicated to running other applications. Typically, software applications may be stored in the internal memory 192 before they are accessed and loaded into the processor 191. In some mobile devices, the processor 191 may include internal memory sufficient to store the application software instructions. For the purposes of this description, the term memory generally refers to all memory accessible by the processor 191, including the internal memory 192, the VSIM memory unit 193 and memory within the processor 191 itself. The internal memory 192 and the VSIM memory unit 193 may be volatile or nonvolatile memory, such as flash memory, or a mixture of both. In a preferred embodiment, the VSIM memory unit 193 is nonvolatile memory in order to retain the service contract provisioning data when the mobile device is turned off. Mobile devices also typically include a key pad 13 and menu selection buttons or rocker switches 12 for receiving user inputs.

Figure 3:
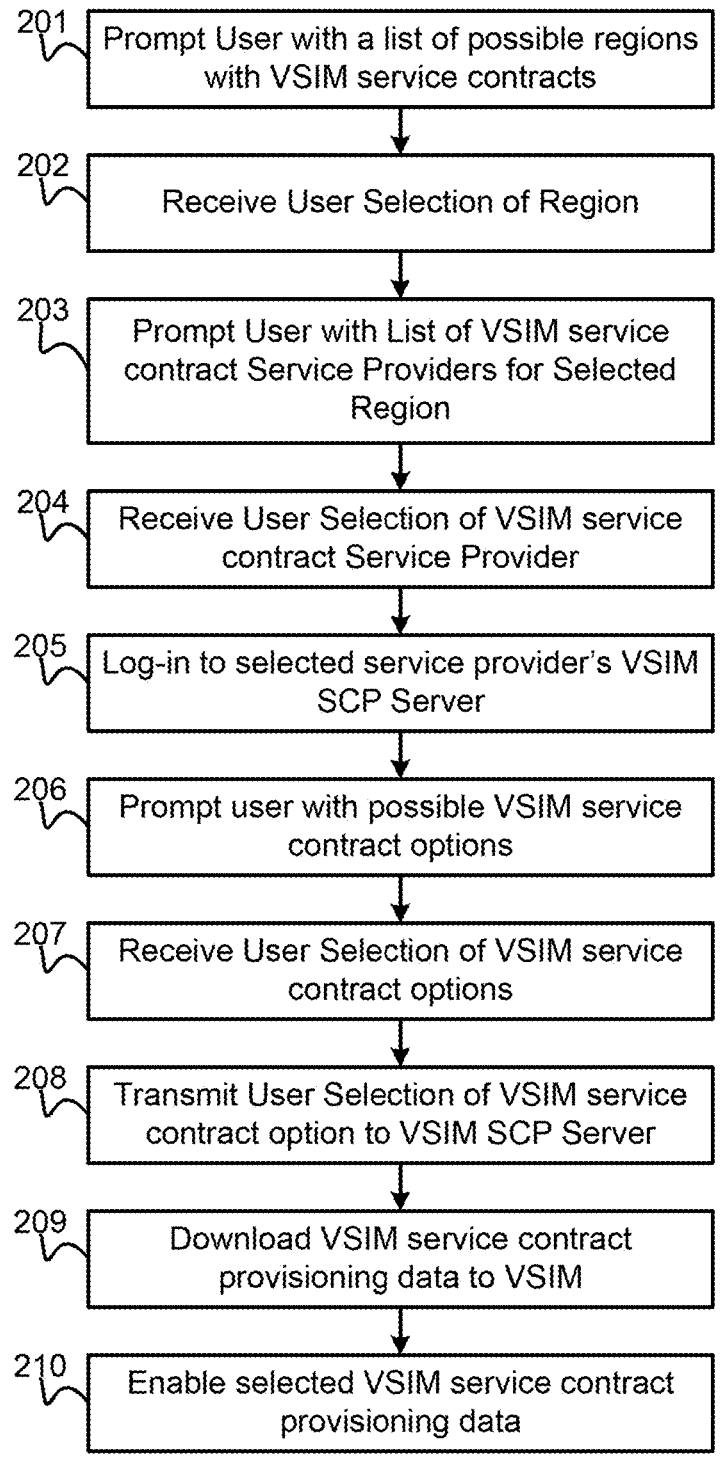
FIG. 3 is a process flow diagram illustrating method steps of an embodiment method for obtaining a VSIM service contract.

FIG. 3 illustrates a process flow of example method steps that may be performed to acquire VSIM service contract provisioning data. In operation, a mobile device 101 may be programmed with sufficient general provisioning data stored in the VSIM memory unit 193 which permits the mobile device 101 to connect with a wireless data network for the limited purpose of communicating with any of VSIM SCP servers 102-105. While the general provisioning data will not allow the mobile device 101 to establish normal communications, it will allow the mobile device 101 to connect with VSIM SCP servers 102-105 in order to purchase selected service contract provisioning data. Each VSIM SCP server 102-105 may be operated by a different service provider but some service providers may operate a number of VSIM SCP servers so as to offer different types of service contracts, address different regions or provide redundant capability. The mobile device 101 may have stored in its internal memory 192 or the VSIM memory unit 193 a list of server network addresses (e.g., IP address or URL) for servers of various carriers within different regions offering VSIM service contracts. These server network addresses and the corresponding service providers may be listed by region, country, or continent, for example.

Referring to FIG. 3, if the menu is organized by regions (versus service carrier) the list of possible regions may be displayed to the user on the mobile device display 11, step 201. This menu may be presented upon the occurrence of a variety of events including, but not limited to initial power-up, when a previously purchased VSIM PPSC has expired, or whenever the mobile device 101 determines that its current provisioning data will not operate in its current location. The user may select a region for which the user desires to purchase a VSIM service contract by using any of a variety of user interface keys 12, 13 and switches incorporated within the mobile device 101. The region selection is received by the mobile device processor 191, step 202, which in turn prompts the user with a list of possible VSIM service contract service providers for the selected region, step 203. Again using any of a variety of user interface keys 12, 13 and switches incorporated within the mobile device 101, the user selects a VSIM service contract service provider from the displayed list. The user selection of service contract service providers is received by the processor 191 of the mobile device 101, step 204. Based upon the received VSIM service contract service provider selection, the mobile device processor 191 accesses the corresponding server network address, initiates a communication link and logs in, step 205.

Once logged in to the appropriate VSIM SCP server (102-105), the mobile device may receive a list of VSIM service contract options and present these in a display prompting the user to make a selection, step 206. These VSIM service contract options may include PPSCs, MSCs and varying combinations of voice and data plans, as well as various durations or usage restrictions, for example. In response, the user selects a service contract option from the displayed list. The user's selection of a service contract option is received by the processor 191 of the mobile device 101, step 207, and transmitted to and received by the selected VSIM SCP server (102-105), step 208. Based upon the received selection, the service contract provisioning data is downloaded to the mobile device VSIM memory unit 193 by the VSIM SCP server (102-105) via the established data connection, step 209. Finally, the VSIM service contract is enabled and activated on the mobile device 101, step 210. The selected VSIM service contract may be enabled by loading the corresponding provisioning data into a VSIM provisioning data buffer 314 (see FIG. 7) or by directing the mobile device processor 191 to the memory location storing the corresponding provisioning data via a pointer list.

As part of the enabling and activation step, codes identifying the mobile device 101 may be transmitted to the selected VSIM SCP server (102-105) and stored with other VSIM service contract account data in either in the mass storage device of the VSIM SCP server (102-105) or in a corresponding VSIM SCP database 106-109. The stored mobile device identifying codes and service contract account data will allow the VSIM SCP service provider to monitor individual VSIM service contract accounts to enable communications so long as the VSIM service contract remains valid. As an alternative step (not shown), any of a number of well known electronic payment and e-commerce methods may be implemented to handle the exchange of funds prior to the downloading of provisioning data to the VSIM memory unit 193.

In order to establish and route wireless communication calls, conventional mobile devices and service networks are assigned special codes. These codes, which are described below, identify the individual mobile device 101 to the various communication networks and identify accessed networks to the mobile devices. Without the proper codes, no communication link may be established. Thus, to provide a mobile device 101 with a VSIM service contract, the network identifying codes are downloaded in the VSIM service contract provisioning data and the mobile devices' identifying codes are uploaded into the VSIM service contract account data stored in the mass storage device VSIM SCP server (102-105) or corresponding VSIM SCP database (106-109). The VSIM SCP server (102-105) handling the mobile device's 101 VSIM service contract account uses the mobile device's identifying code to validate the mobile device 101 each time it attempts to gain access to a communication network and monitor the mobile device's 101 usage in order to determine whether the VSIM service contract account is valid. For example, in instances where the VSIM service contract is a PPSC, the VSIM SCP server (102-105) may determine whether the VSIM PPSC has expired or not. If the VSIM PPSC has expired, the VSIM SCP server (102-105) may offer the user an opportunity to "re-charge" the VSIM PPSC account by purchasing more pre-paid service (e.g., purchasing more minutes), or deny the mobile device 101 access to a communication network after expiration if the user refuses to purchase more service time.

The identifying codes include:

(a) an Electronic Serial Number (ESN), which is a unique 32-bit number programmed into the mobile device when it is manufactured;

(b) a Mobile Identification Number (MIN), which is a 10-digit number derived from the unique phone number assigned to the mobile device;

(c) a System Identification Code (SID), which is a unique 5-digit number that is assigned to each wireless service provider by the FCC;

(d) a Preferred Roaming List (PRL) for CDMA-type mobile devices/Public Land Mobile Network (PLMN) for GSM-type mobile devices which is a priority listing of approved SID's which the service provider provides to the mobile device in order to determine which network SIDs the mobile device is allowed to utilize for service; and (e) an Authentication Key (A-Key) which is a shared secret key that can be generated after initial authentication.

While the ESN is typically considered a permanent part of the mobile device 101, the MIN, SID and PRL/PLMN are programmed into the VSIM 193 when a VSIM service contract is purchased and activated. In some embodiments the ESN may be programmed into the VSIM 193 as well. In such embodiments the ESN programmed on the VSIM may be checked as opposed to the mobile device 101 ESN. Each time a mobile device 101 accesses a communication network, either the ESN or MIN is checked by the VSIM SCP server to insure that the VSIM service contract is still valid. If the VSIM service contract is valid the VSIM SCP server will connect the communication request and begin decrementing the remaining time if the VSIM service contract is a PPSC account or increment the usage time if the VSIM service contract is a MSC. In this way, the service provider can insure that the mobile device 101 is only permitted access to the communication network in accordance with the terms of the VSIM service contract.

As part of the downloaded provisioning data, CDMA-type mobile devices are programmed with a PRL. GSM-type mobile devices are provisioned with a PLMN, which operates similar to the PRL. For simplicity, the embodiments are described using CDMA terminology. However, similar embodiment systems and methods may be implemented in GSM-type mobile devices in similar manner.

While a user of a mobile device 101 may purchase a VSIM service contract from a particular service provider, the service provider may have agreements with other service providers to enable its customers to utilize the communication networks of other service providers. This allows a service provider to provide its customers with a broader coverage zone without the need to install its own equipment across the entire coverage zone. In some situations this is sometimes referred to as "roaming." Thus, when a user purchases a VSIM service contract through a particular service provider, the user may be given access to and use of other service providers' communication networks. The PRL is a prioritized list of the alternative communication networks that a user may access if the primary communication networks are not available.

In any given region, multiple wireless and cellular communication networks may be operated by multiple service providers. Also, other private and/or non-commercial communication networks may be operating in a region. In order to determine which communication network a mobile device 101 may utilize in a given region, the mobile device 101 accesses the downloaded PRL for the selected service contract stored in the VSIM 193 to determine which channels or analog frequencies will be scanned and in what priority order to establish a communication link.

The PRL is maintained in such a manner that the mobile device can readily determine which communication networks cover common geographical regions. The references to common geographic regions refer to areas of common radio coverage. Moreover, the communication networks providing service in a common geographical region are prioritized, i.e., ranked from most desirable to least desirable. The mobile device is programmed to attempt to acquire service beginning with the available most desirable communication network in the mobile device's current geographical area. There is no point in trying to acquire service on a communication network outside of the mobile device's current geographic region since communication networks typically provide service only within a limited geographic region.

On many communication networks, regularly updating the PRL is advised if the user operates the mobile device outside the home system frequently, particularly if they do so in multiple different areas. This allows the mobile device to choose the best roaming carriers, particularly "roaming partners" with whom the home system has a cost-saving roaming agreement, rather than using non-affiliated carriers. PRL files can also be used to identify a home system along with roaming partners, thus making the PRL an actual list that determines the total coverage of the user, both home and roaming coverage.

Associated with each communication network in the PRL is a system ID (SID), as well as corresponding acquisition parameters (band, channel, etc.) for each communication network. The PRL is created, loaded and updated by the VSIM service contract service provider. When a user purchases and enables a VSIM service contract, the provisioning data that is downloaded into the VSIM 193 of the mobile device 101 replaces the previous PRL so that the SID and acquisition parameters for the new communication network is recognized by the mobile device 101.

The PRL is maintained by the service provider and is normally not accessible to the user. Many service providers provide the ability for the user to download the latest PRL to their device by dialing an Over-the-air (OTA) feature code, such as *228. Alternatively, the latest PRL may be downloaded into the mobile device via a hardware connection.

Similarly, the PRL may be updated to the VSIM 193 of the mobile device 101 via a network VSIM push of a user initiated download call, such as via *228.

The PRL includes two tables (along with some header and overhead information). The two tables are a System Table and an Acquisition Table. The System Table is a prioritized list of communication networks that the mobile device is permitted to access (home system and roaming networks). Each communication network entry in the system table belongs to a geographic area known as a GEO. Each entry also provides an acquisition table index where the frequencies associated with that particular communication network are identified and a roaming indicator that dictates the type of indication that should be displayed to the user when they are receiving service from that network. The Acquisition Table is an indexed list of frequencies on which the mobile device may search for particular networks. The acquisition table optimizes network acquisition time by identifying a limited number of frequencies that should be searched by the mobile device, rather than requiring the mobile device to search the entire frequency spectrum.

FIG. 4 illustrates an exemplary system table and acquisition table for a PRL for a particular geographic region. The Acquisition Table 152 contains records that list communication channels or frequencies in a priority contact order from top to bottom. For the Acquisition Table as shown, for example, a mobile device would contact PCS CDMA Block B channels first, then Block A channels, then channels 283, 699, 384, and 777. If the mobile device cannot contact these CDMA channels, the mobile unit would attempt to contact the network using Cellular Analog System A frequencies.

The PRL's System Table 151 contains records having several fields. The "SID" field contains the System Identification number of preferred communication networks. The "selection preference" identifies the relative priority of each network in terms of connection desirability. As shown, for example, it is more desirable for the mobile device to connect with the enabled VSIM service contract home system SID than any other network. The "Roaming Indicator" field indicates a roaming indication display status on the mobile device as either "off" or "on" depending on which network the mobile device is connected to. Typically, if the mobile device is connected to the home system of the enabled VSIM service contract, then the roaming indicator will be off. The "Acquisition Index" field refers back to the Acquisition Table record number associated with a SID. Thus, the "Acquisition Index" field entry indicates the channel(s) or frequency(ies) associated with the particular SID. As shown, for example, the SID of the home system (Acquisition Index 0) is associated with PCS CDMA Block B channels (Acquisition Table record 0). Similarly, SID of Roaming Partner 3 (Acquisition Index 3) is associated with Cellular Analog System frequencies (Acquisition Table record 3).

Thus, when the mobile device 101 downloads the VSIM service contract provisioning data (step 209) into the VSIM memory unit 193, the mobile device 101 downloads the PRL corresponding to the VSIM service contract. By downloading a PRL from the VSIM SCP server (102-105) and/or VSIM SCP database (106-109) into the VSIM memory unit 193 of the mobile device 101, the mobile device 101 is provided with all of the necessary parameters to establish a communication link with the communication network supporting the VSIM service contract.

Figure 5:
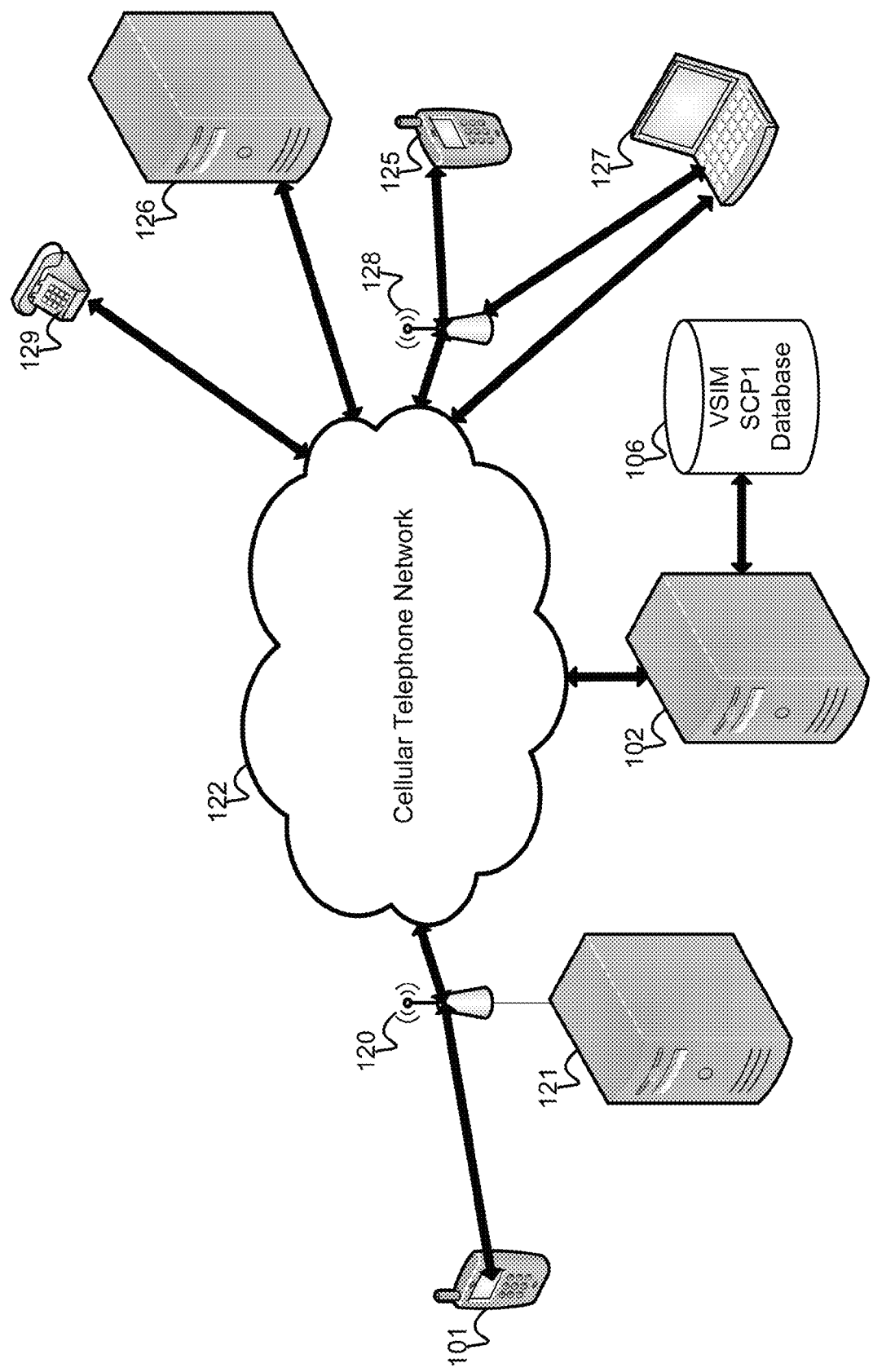
FIG. 5 is a system diagram of a cellular communication network implementing a VSIM service contract to connect a call.

FIG. 5 illustrates an exemplary system diagram of a mobile device 101 using a VSIM service contract to establish a call. When a mobile device 101 selects a VSIM service contract account to establish a call, the mobile device 101 will locate the provisioning data for the selected VSIM service contract in the VSIM memory unit 193 and may copy the selected VSIM service contract PRL into the active call application memory. The VSIM memory unit 193 may contain the provisioning data for a plurality of VSIM service contracts. The selected VSIM service contract may be any of the varying types of VSIM service contracts offered on the VSIM SCP server (102-105) and/or VSIM SCP database (106-109). This step essentially swaps out the selected VSIM service contract PRL for the PRL previously in memory. Using the selected VSIM service contract PRL, the mobile device uses the listed frequencies to acquire a communication network via a base station 120 and make a request to complete a voice or data call. The base station 120 may be part of a communication network listed in the downloaded PRL that operates as a portal to the cellular telephone network 122. The base station 120 may be in communication with a server 121 that receives the communication request from the mobile device 101 via the base station 120. The communication request may include VSIM service contract account information indicating which service provider is supporting the selected VSIM service contract account and the ESN/MIN of the mobile device 101 making the communication request. Based upon the VSIM service contract account information, the communication request is routed via the cellular telephone network 122 to the VSIM SCP server (shown in FIG. 5 as 102) supporting the VSIM service contract account. The VSIM SCP server may refer to data stored in either the mass storage of the VSIM SCP server or a corresponding VSIM SCP database (106) to validate the VSIM service contract account and requesting mobile device 101. If the VSIM service contract account is still valid (e.g., there is sufficient access time remaining in the PPSC account or the MSC is still active), the VSIM SCP server (102) validates the VSIM service contract account and authorizes the connection of the mobile device 101 to its intended recipient. The intended recipient may be another mobile device 125, a server hosting data 126, a computing device 127, and/or landline telephone 129. The call may then be routed through the cellular telephone network 122 to the intended recipient. In instances where a wireless device (e.g., mobile device 125 or computing device 127) is the intended recipient, the call may be routed through a second base station 128. Alternatively, the intended call may be routed through the conventional telephone network 122 to the intended recipient via landline connections.

Figure 6:
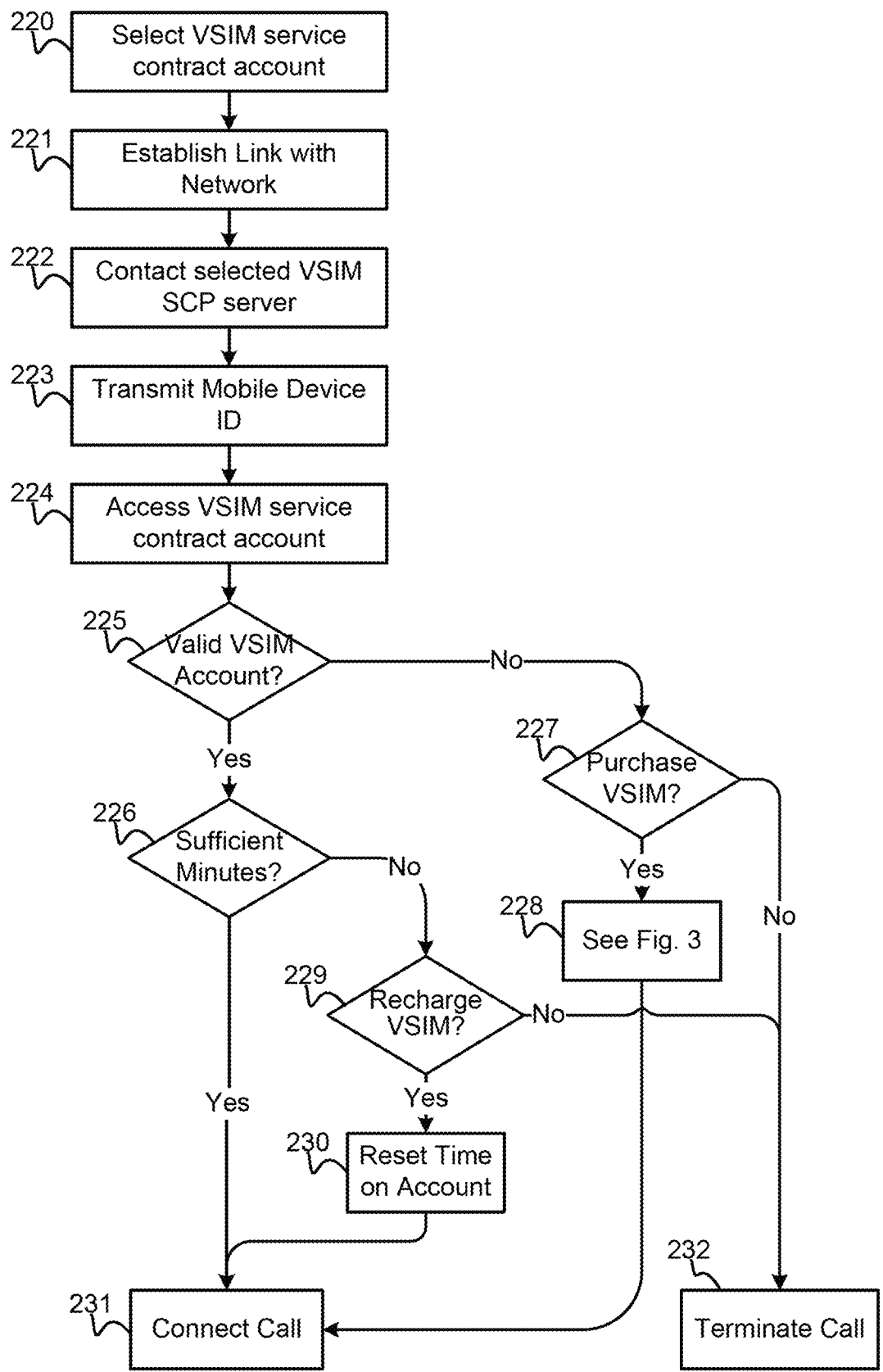
FIG. 6 is a process flow diagram illustrating steps of an embodiment method by which a mobile device completes a communication call using a VSIM service contract.

FIG. 6 illustrates a process flow of steps that may be performed to connect a call using a VSIM service contract. A user of a mobile device 101 may have a number of different VSIM service contract accounts stored in the mobile device VSIM memory unit 193. The user must first select which VSIM service contract account the user desires to implement to connect the call, step 220. By selecting the desired VSIM service contract account, the processor 191 retrieves the corresponding provisioning data from VSIM memory 193 and loads it into the active memory buffer 314 for use by the mobile device 101. Using the PRL data associated with the selected VSIM service contract account, the mobile device 101 will establish a communication link with an available communication network and make a call request, step 221. Based on the VSIM service contract account data included in the call request, the VSIM SCP server (shown in FIG. 5 as 102) may be contacted in order to validate the VSIM service contract account, step 222. To validate the VSIM service contract account, the relevant data identifying the VSIM service contract account and the mobile device 101 (EIN/MIN) will be transmitted to the VSIM SCP server 102. Once the identifying information is received by the VSIM SCP server 102, the identifying data is used to access the VSIM service contract account data stored on either the mass storage device of the VSIM SCP server 102 or a corresponding VSIM SCP database 106. The VSIM SCP server 102 will check the VSIM service contract account data to insure that the VSIM service contract account is still valid, decision 225.

If the VSIM service contract account is not a valid account (i.e., decision 225=No) then the VSIM SCP server may optionally return a message to the mobile device 101 indicating that the VSIM service contract account is invalid and providing the user of the mobile device 101 with the option of purchasing a valid VSIM service contract account, decision 227. If the user responds in the affirmative (i.e., decision 227=Yes) then the mobile device and VSIM SCP server may implement steps 201-210 shown in FIG. 3 to allow the user of the mobile device 101 to purchase a valid VSIM service contract account, step 228. Thereafter, the newly activated VSIM service contract may be used to connect the call, step 231. Alternatively, if the optional step of providing the user with the ability to purchase a valid VSIM service contract account is not offered, then the call is simply terminated, step 232. Similarly, if the user declines to purchase a valid VSIM service contract account (i.e., decision 227=No), then the call is terminated, step 232.

If, however, the VSIM service contract account is valid (i.e., decision 225=Yes), then the VSIM SCP server 102 will determine if there are sufficient minutes left on the VSIM service contract account to support the call request, decision 226. In the case where the VSIM service contract is a MSC, this determination may entail determining whether there are sufficient "in-plan" minutes or if overage minutes apply. In the case where the VSIM service contract is a PPSC, this determination may entail determining if sufficient minutes are left on the PPSC. A pre-determined number of minutes threshold may be used to determine if "sufficient" minutes are available on the VSIM service contract account. If there are sufficient minutes left on the VSIM service contract account (i.e., decision 226=Yes), then the call is connected using the VSIM PPSC account data, step 231. The VSIM SCP server 102 will continue to monitor the call after it is connected to determine how many minutes should be counted against the VSIM service contract account once the call is completed. Alternatively, the VSIM SCP server 102 may decrement minutes from the VSIM PPSC account as the call proceeds so that the caller can be notified if the call results in the minutes remaining falling below the threshold during the call.

If there are not sufficient minutes left on the VSIM service contract account, such as if all prepaid minutes have been used or if all "in-plan" minutes have been used, (i.e., decision 226=No), the VSIM SCP server may send a message to the mobile device 101 indicating that the VSIM service contract account is expired or nearly expired and providing the user of mobile device 101 with an option to recharge the VSIM service contract account, decision 229. If the user elects to recharge the VSIM service contract account (i.e., decision 229=Yes), then the time remaining on the VSIM service contract account is reset or set to the number of additional number of minutes purchased, step 230, and the call is connected as requested, step 231. If, however, the user declines to recharge the VSIM service contract account, then the call request is terminated, step 232.

In an embodiment, the VSIM SCP server may decrement time from the VSIM service contract while the call is ongoing. If the time remaining on the VSIM service contract account then falls below the threshold minutes, the VSIM SCP may alert the caller, such as by placing the call on hold and offering the caller an opportunity to recharge the account, step 229. If the user elects to purchase additional time, the account balance is reset accordingly, step 230, and the call continues (step not shown but similar to step 231). However, if the user elects not to purchase additional time (i.e., decision 229=No), the call may be terminated as soon as the remaining balance reaches zero, step 232. In embodiments where the VSIM service contract account is an open-ended account (i.e., no limit on calling minutes), steps 226, 229, and 230 may be omitted.

Figure 7:
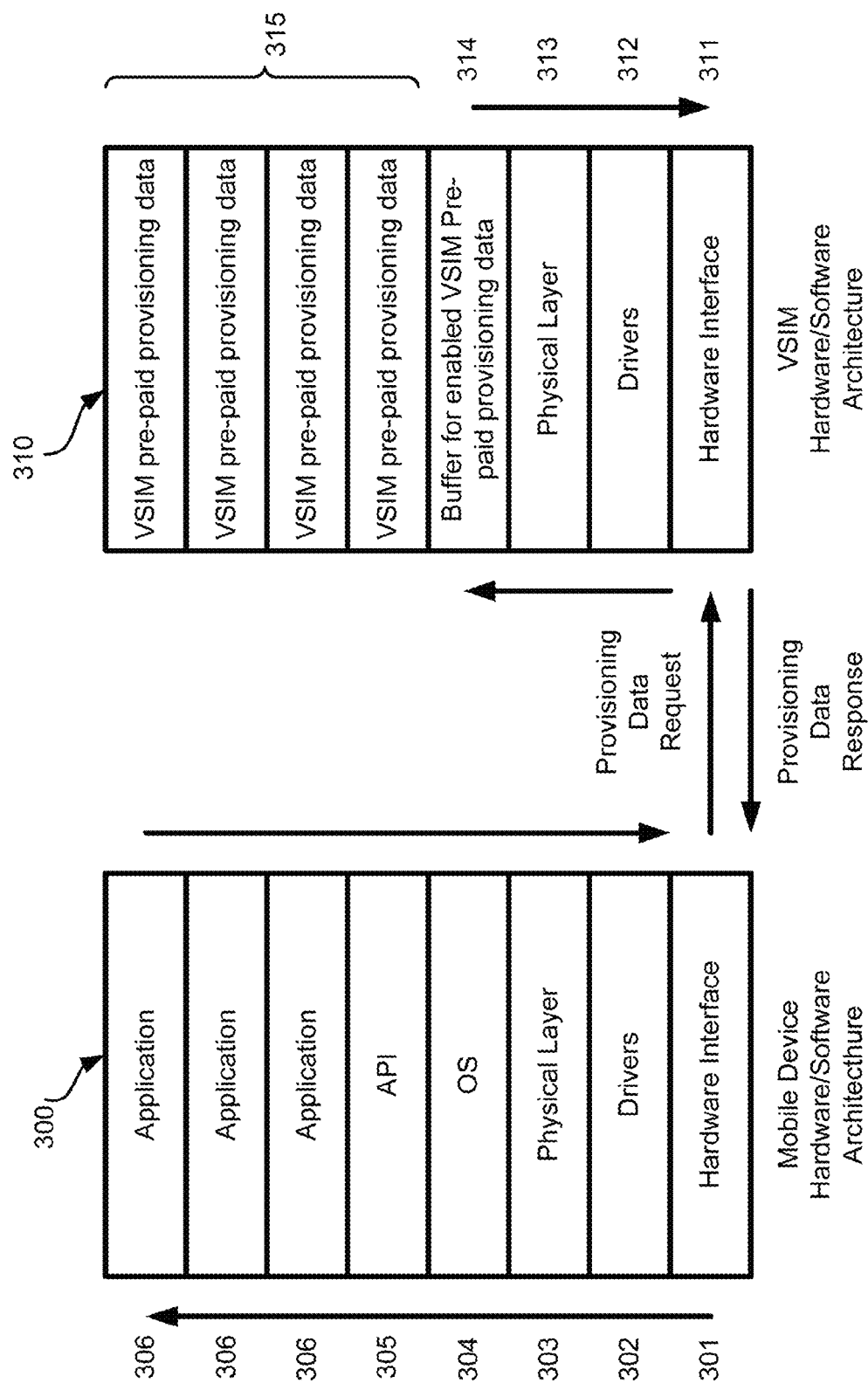
FIG. 7 is a hardware/software architecture diagram of the mobile device and VSIM illustrating the flow of data in a provisioning data request and response.

FIG. 7 illustrates a mobile device hardware/software architecture 300 in conjunction with a VSIM hardware/software architecture 310. When the mobile device 101 is functioning, various applications 306 operate on or request services from the mobile device's various hardware elements. For example, these hardware elements may include the processor and internal memory, input elements such as a keyboard or microphone, output elements such as the display or speaker (none shown) and communication units such as cellular transceivers, Global Positioning System (GPS) receivers, WiFi wireless transceivers, and Bluetooth local wireless transceivers. Some applications 306 may access the mobile device's cellular transceiver to initiate a telephone or data call. In order to initiate a telephone or data call, the application 306 will need to access the provisioning data stored in the VSIM memory unit 193. The application 306 requests this provisioning data through the hardware/software architecture 300 and 310. As illustrated in FIG. 7, applications 306 may communicate with the device operating system 304 via an API layer 305. The API layer 305 contains code that an operating system 304 provides to support requests for processor services to be made of it by the applications 306. The operating system 304 performs basic tasks such as controlling and allocating memory, prioritizing system requests, controlling input and output devices, facilitating networking and managing file systems. The operating system 304 communicates with the various device resources via the physical layer 303. The one or more driver layers 302 may be provided to control various device elements such as connected modems or transceivers. The driver layer 302 contains a specific type of computer software developed to allow interaction with a particular hardware element. Typically this constitutes an interface for communicating with the specific hardware element, through the specific computer bus or communications subsystem that the hardware element is connected to, providing commands to and/or receiving data from the hardware element, and on the other end, the requisite interfaces to the operating system 304 via the physical layer 303. The hardware interface 301 comprises the physical connections with the hardware device such as the socket or receptacle that the hardware element plugs into.

In the various embodiments, when an application 306 running on a mobile device 101 requests provisioning data stored in the VSIM memory 315, the data request propagates through the device hardware/software architecture 300 until the request reaches the hardware interface layer 301 and enters into the VSIM hardware/software architecture 310 via the VSIM hardware interface 311. This data access request may be by direct memory access and/or General Purpose Input/Output (GPIO). The VSIM hardware interface layer 311 may comprise the connector pins which may be the physical connection plugging the VSIM 193 into the mobile device 101 or it may be the bus connection that the VSIM 193 is connected to when the VSIM is built into the internal memory 192 of the mobile device 101. Once received in the VSIM hardware layer 311, the request for the provisioning data corresponding to the currently active VSIM service contract in the VSIM memory 314 that originated in the applications 306 propagates up the hardware/software architecture 310. The driver 302 accesses the VSIM data via the hardware interface 311 and provides the information to the applications. Alternatively, the data request is communicated from the hardware interface 311 to the driver layer 312. As above, the driver layer 312 contains a specific type of computer software developed to allow interaction between the VSIM memory unit 193 in the physical layer 313 to the hardware interface 311. The data request then accesses data in the enabled VSIM provisioning data buffer 314, which is a memory block used to hold the provisioning data for the service provider currently selected for use. As a result, the currently selected VSIM service contract provisioning data 314 is accessed and the requested information pass back to the requesting application 306 in a reverse manner. The VSIM provisioning data buffer 314 may be an implementation of an embedded file system or secured file system. The embedded file system provides the operating system (OS) abstraction to access the VSIM data as a logical file. A secured file system provides an additional level of protection against spoofing of VSIM data through software or hardware encryption.

As described above, the VSIM memory unit 193 may contain a plurality of VSIM service contract account provisioning data sets 315 for different VSIM service contract accounts purchased by the user. When the user selects a particular one of the stored VSIM service contract accounts for use, such as a VSIM service contracts providing voice call services, the mobile device processor 191 accesses the selected VSIM provisioning data 315 via the access layers 311-313 as described above and copies the provisioning data into the enabled VSIM provisioning data buffer 314. Thereafter, access requests received from applications will be provided provisioning data from the enabled VSIM provisioning data buffer 314.

Alternatively, the provisioning data corresponding to each of the plurality of VSIM service contract accounts may be separately stored in locations within the VSIM memory unit 193. The mobile device processor 191 may maintain an enabled VSIM pointer in a buffer which points (by holding the memory address of the corresponding data) to the currently enabled VSIM service contract provisioning data. As different VSIM service contracts are selected to complete a voice or data call, the enabled VSIM pointer stored in the pointer buffer is changed to direct the mobile device processor 191 to memory location within the VSIM memory unit 193 of the currently selected VSIM service contract provisioning data.

The hardware/software architecture 300 and 310 illustrated in FIG. 7 is meant only as an illustration of one example organization of data and software for implementing the various embodiments. As will be appreciated by one of skill in the art of cellular handheld device design and programming, other software/hardware architectures may be used with equal effectiveness.

Figure 8:
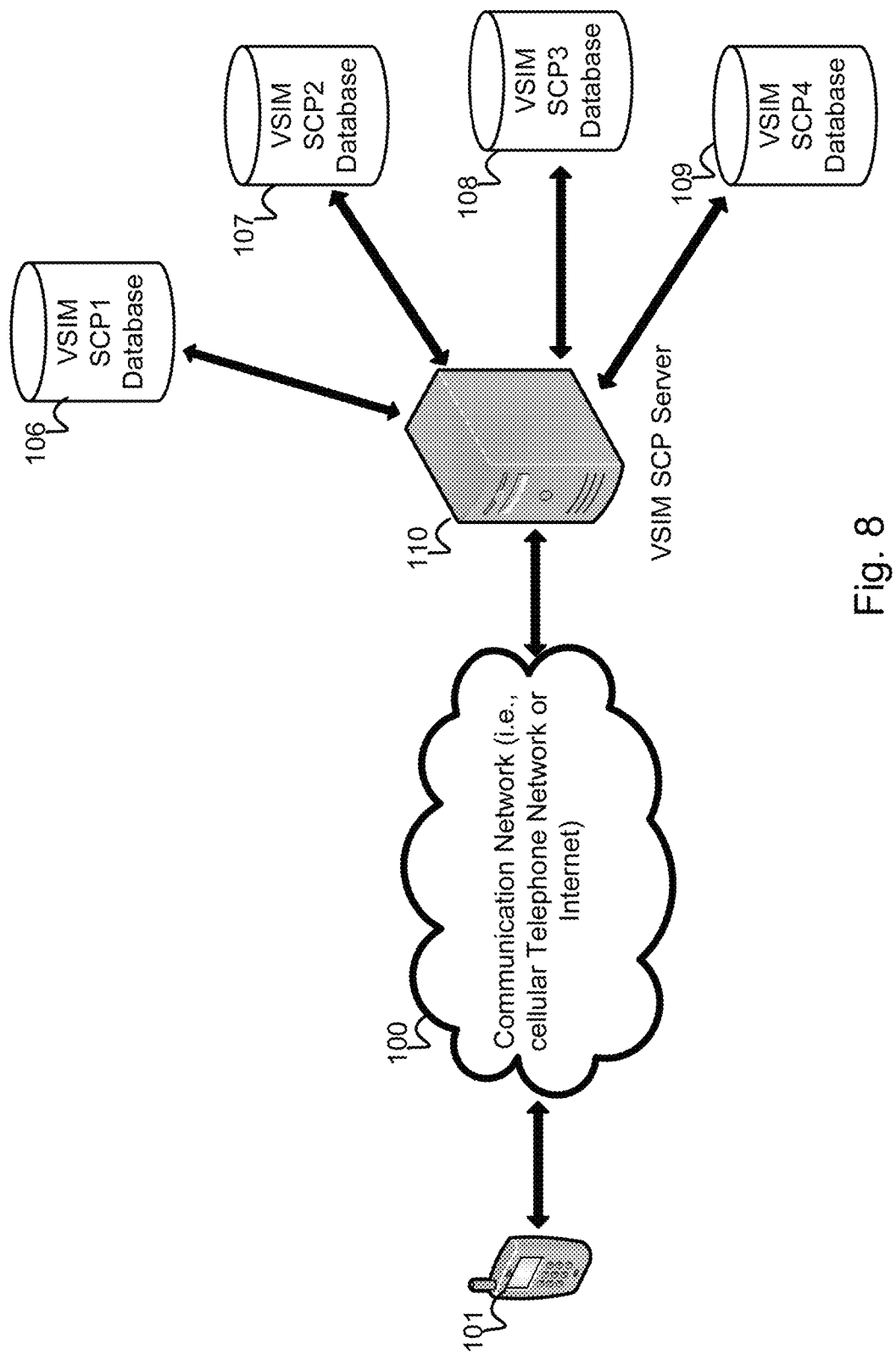
FIG. 8 is a system diagram illustrating an alternative embodiment communication system in which a mobile device may obtain a VSIM service contract.

An alternative embodiment for providing VSIM service contract accounts is shown in FIG. 8. In this alternative embodiment, a single VSIM SCP server 110 acts as a central server to a plurality of VSIM SCP databases 106-109. For example, a mobile device 101 may connect to a single central VSIM SCP server 110 via a communication network 100. The single central VSIM SCP server 110 may communicate with a plurality of VSIM SCP databases (106-109) to allow the mobile device 101 to connect with a single VSIM SCP server 110 and obtain VSIM service contract accounts from a variety of service providers. As with the previous embodiment, the VSIM SCP databases 106-109 each contain the necessary provisioning data for each VSIM service contracts offered by each of the respective service providers. By providing a central VSIM SCP server 110, this embodiment may be used to permit users to be assigned a single telephone number even though the user may maintain a variety of VSIM PPSC and MSC accounts. It should be noted that the single central VSIM SCP server 110 may be a regional server and that the mobile device 101 may connect with multiple central VSIM SCP servers depending upon which particular region the mobile device 101 is currently located. For example, if the mobile device 101 is currently located in Europe, the mobile device 101 may connect with the VSIM SCP server 110 servicing Europe. Similarly, a central VSIM SCP server 110 may be situated in other geographic regions (e.g., Asia, Western Asia, Eastern Asia, Africa, South America, etc.). Regional VSIM SCP servers 110 may service geographic regions of varying size depending on the number of mobile device 101 operating within the region. As more and more mobile devices are operating within a region, the size of the region serviced by a single VSIM SCP server 110 may decrease in size and vice versa.

Figure 9:
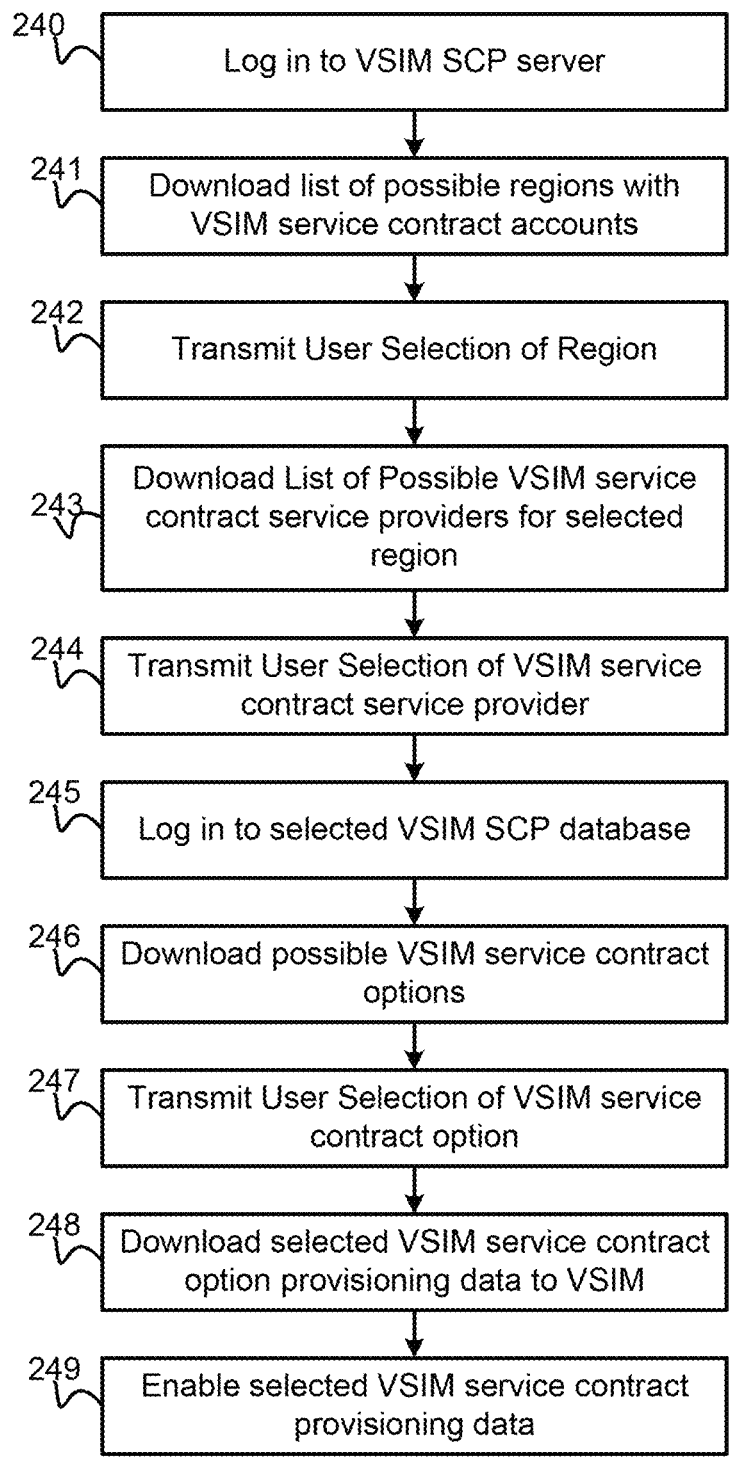
FIG. 9 is a process flow diagram illustrating steps of an alternative embodiment method for obtaining a VSIM service contact.

FIG. 9 illustrates alternative method steps that may be implemented to acquire a VSIM service contract account. In this embodiment, a single central VSIM SCP server is connected to a plurality of VSIM databases. Each of the plurality of VSIM databases is operated by a separate service provider to provide users with the ability to purchase any of the variety of VSIM service contracts that the service provider offers. In this embodiment, users connect to the central VSIM SCP server which in turn connects to a selected service provider's independent VSIM database to purchase a VSIM service contract offered by the selected service provider. In instances where the mobile device 101 is operating in an embodiment system such as the one shown in FIG. 8, where a single VSIM SCP server 110 connects to a plurality of VSIM SCP databases 106-109 operated by independent service providers, additional mobile device 101 internal memory 192 may not be required to store multiple server network addresses as in other embodiments. Rather, the user of mobile device 101 may simply connect with a single VSIM SCP server 110 each time the user wishes to purchase a new VSIM service contract, so only the one server VSIM SCP network address is stored in memory. For example, if the user is planning to travel internationally, before the trip the user can log onto the VSIM SCP server 110 to purchase a PPSC for each country to which the user intends to travel. In instances where the VSIM SCP server 110 is being hosted by the user's conventional service provider, the additional VSIM service contracts could simply be billed to the user's long term account.

In the embodiment illustrated in FIG. 9, a communication link between the mobile device 101 is established with the VSIM SCP server 110, step 240. Once the mobile device 101 has logged into the VSIM SCP server 110, the mobile device 101 downloads and displays a list of regions for which the user may purchase a VSIM service contract account through the VSIM SCP server 110, step 241. These regions may be listed, for example, by region, country, or continent. The user may select the region that the user desires by using any of a variety of user interface keys 12, 13 and switches incorporated within the mobile device 101. The user selection is transmitted to the VSIM SCP server 110, step 242. Based upon the user selection, the VSIM SCP server 110 downloads a list of possible VSIM service contract providers for the selected region to the mobile device 101 for display to the user, step 243. Again using any of a variety of user interface keys 12, 13 and switches incorporated within the mobile device 101, the user selects a VSIM service contract provider from the displayed list. The user's selection of VSIM service contract providers is transmitted to the VSIM SCP server 110, step 244.

Based upon the received selection, the VSIM SCP server 110 initiates a communication link with the VSIM SCP database (106-109) corresponding to the selected VSIM service contract provider, step 245. Once logged in to the appropriate VSIM SCP database (106-109), the list of VSIM service contract options is downloaded and transmitted to the mobile device 101 for display to the user, step 246. These VSIM service contract options may provide varying combinations of voice, data, voice and data plans, as well as varying durations of access. Using any of a variety of user interface keys 12, 13 and switches incorporated within the mobile device 101, the user selects a VSIM service contract option from the displayed list. Alternatively, the VSIM service contract may be automatically selected by the mobile device processor 191 using a user specified profile to determine when and which VSIM service contract to select. The VSIM service contract selection is transmitted to and received by the selected VSIM SCP database (106-109) via the VSIM SCP server 110, step 247.

Based upon the transmitted selection, the VSIM service contract provisioning data is downloaded from the VSIM SCP database (106-109) to the VSIM SCP server 110 which transmits the information to the mobile device 101 which stores the information in the VSIM memory unit 193, step 248. Finally, the VSIM service contract is enabled and activated on the mobile device 101, step 249. As part of the enabling and activation step, codes identifying the mobile device 101 may be transmitted to the selected VSIM SCP database via the VSIM SCP server 110 to be stored with the other VSIM service contract account data in the selected VSIM SCP database 106-109. Storing the identifying code and account data will allow the VSIM service contract provider to monitor individual VSIM service contract accounts and enable communications so long as the VSIM service contract is valid. As an alternative step (not shown), any of a number of well known electronic payment and e-commerce methods may be implemented to handle the exchange of funds prior to the downloading of provisioning data to the mobile device 101.

In other embodiments, some service providers may elect to operate their own independent VSIM SCP servers 102-105 (see FIG. 1) and VSIM databases 106-109, while other service providers operate an independent VSIM database 106-109 connected to a central VSIM SCP server 110. In such an embodiment, the system may contain both independent and central VSIM SCP servers. In such an embodiment, the process flow shown in both FIGS. 3 and 8 may be implemented depending upon which VSIM SCP server (independent or central) hosts the selected service provider's VSIM service contract.

Figure 10:
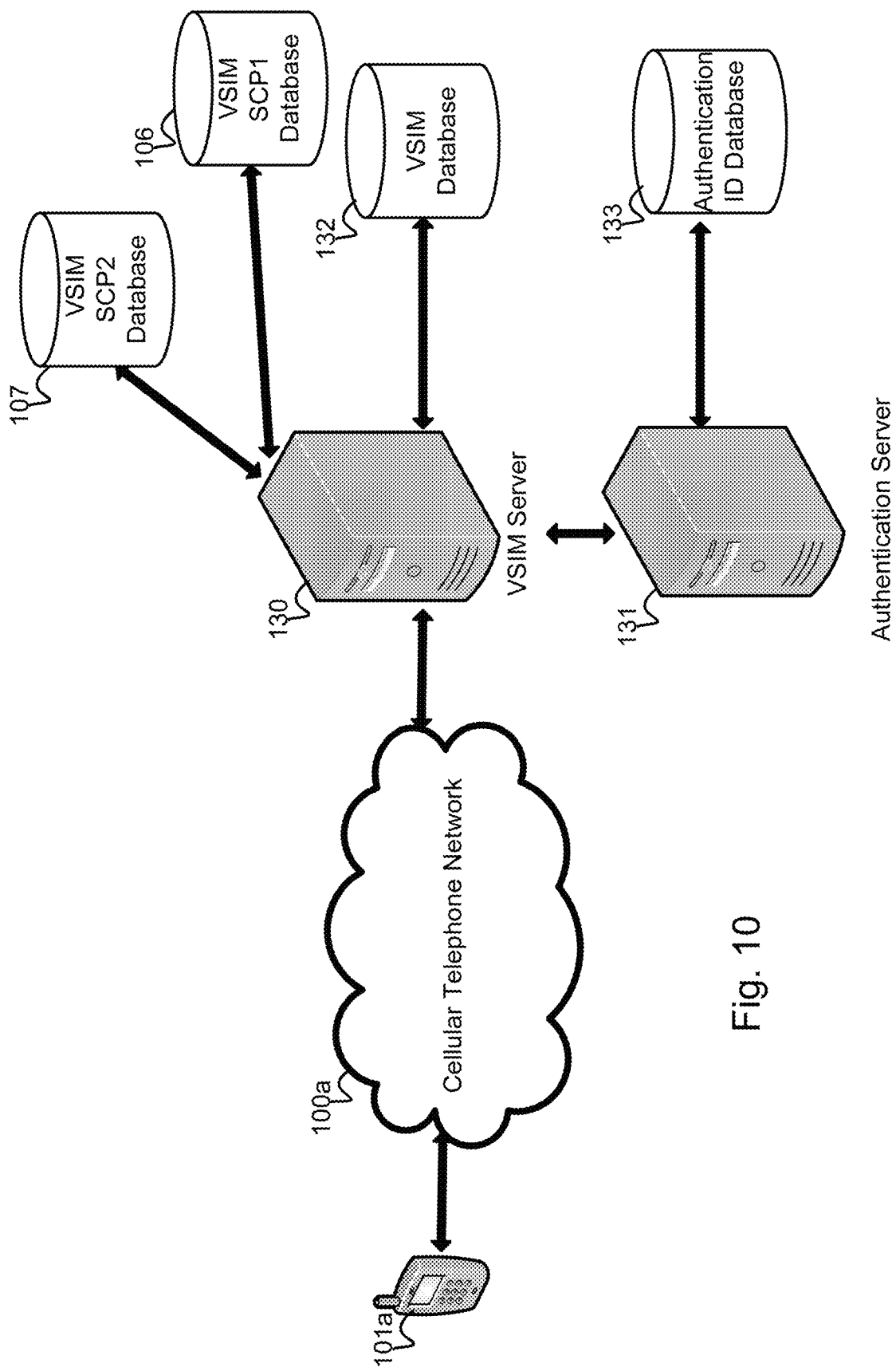
FIG. 10 is a system diagram illustrating an alternative embodiment communication system in which a mobile device may obtain a VSIM service contract as well as personal data stored in a remote VSIM server/database.

An alternative embodiment for providing both VSIM service contract accounts as well as user personal VSIM data is shown in FIG. 10. In instances where users do not have their personal mobile device 101 on hand, users may rent or borrow a mobile device 101a. In other instances, a user may purchase a disposable mobile phone. In any case, when users are without their own mobile device 101 they may require not only a VSIM service contract account but also access to the personal data stored on their own mobile device 101. In other instances, users may have their own mobile device 101, but have lost personal data from the internal memory 192 of the mobile device 101. This alternative embodiment system and method allows users to access a VSIM service contract account and download personal data that has been backed up on a remote VSIM storage unit 130/132. A more complete description of the remote VSIM storage unit 130/132 is provided in U.S. patent application Ser. No. 11/963,918 entitled "Virtual SIM card for Mobile Handsets", the entire contents of which are hereby incorporated by reference. For sake of simplicity, FIG. 10 and the description herein discusses the borrowed, rented or purchased mobile device 101a. However, a user may also implement the embodiment method and system using the user's personal mobile device 101.

FIG. 10 illustrates an overall architecture of an embodiment wherein a rented or purchased mobile handset 101a communicates over a cellular telephone network with a VSIM server 130 to send and receive both VSIM service contract provisioning data and backed up personal data. A mobile device 101a may be programmed with general provisioning data stored in an internal memory unit 192 which permits the mobile device 101a to communicate with a VSIM server 130 over a cellular telephone network 100a. The VSIM server 130 may be coupled to an authentication server 131 such as by way of a wired, fiber optic or wireless network connection. The VSIM server 130 may contain internal memory storage units such as a mass storage disc drive, or may be in connection with a VSIM database 132, which is capable of storing the personal data information for each individual mobile handset operating on the system. Similarly, the authentication server 131 may contain internal memory storage units such as mass storage disc drives, or may be connected to an authentication database 133, which is capable of storing the authentication credentials for each individual VSIM account operating on the system. In an embodiment, the VSIM server 130 may also act as the authentication server 131 by incorporating authentication functions within the VSIM server software and providing sufficient memory storage units.

Since sensitive personal data, mobile device provisioning information, and authentication and verification information, may be transmitted back and forth between the mobile handset 101a and the VSIM server 130, the VSIM server 130 and the mobile device processor 191 can be configured with software to encrypt such information using known data encryption and key methods to protect data from unauthorized viewing. Information stored in the VSIM 193 is backed up and maintained on the external VSIM server 130.

The VSIM services provided by the VSIM server 130 may be offered to mobile device users as a standard feature of service or as an extra subscription fee service. This architecture allows the provisioning and personal information to be uploaded to the VSIM memory unit 193 at any time, providing flexibility in provisioning and programming new mobile devices. This architecture also provides users with an external backup of personal data which preserves their personal data even if the entire mobile device 101 is lost. By logging onto the VSIM server 130 via the cellular telephone network, users may backup their personal data to the VSIM server 130 and/or VSIM database 132. Then, even if the entire mobile device 101 is lost or destroyed, their personal data is preserved, ready for reloading onto a replacement mobile device.

To restore their personal data or to move their personal data to a rented or borrowed mobile device provisioned with a VSIM service contract, users log onto the VSIM server 130 via the cellular telephone network, authenticating themselves by transmitting authentication credentials for comparison against authentication credentials previously stored in the authentication database 133. Authenticated users are able to restore their personal data and, optionally, provisioning information to a replacement, rented or mobile device by having the information downloaded directly into the VSIM memory unit 193. Users who are not authenticated are denied access to the VSIM database 132. In addition, the VSIM server 130 may act as a central VSIM SCP server similar to the central VSIM SCP server 110 described above with reference to FIG. 9 by being connected to at least one VSIM SCP database (106, 107) to permit users to purchase a VSIM service contract.

Figure 11:
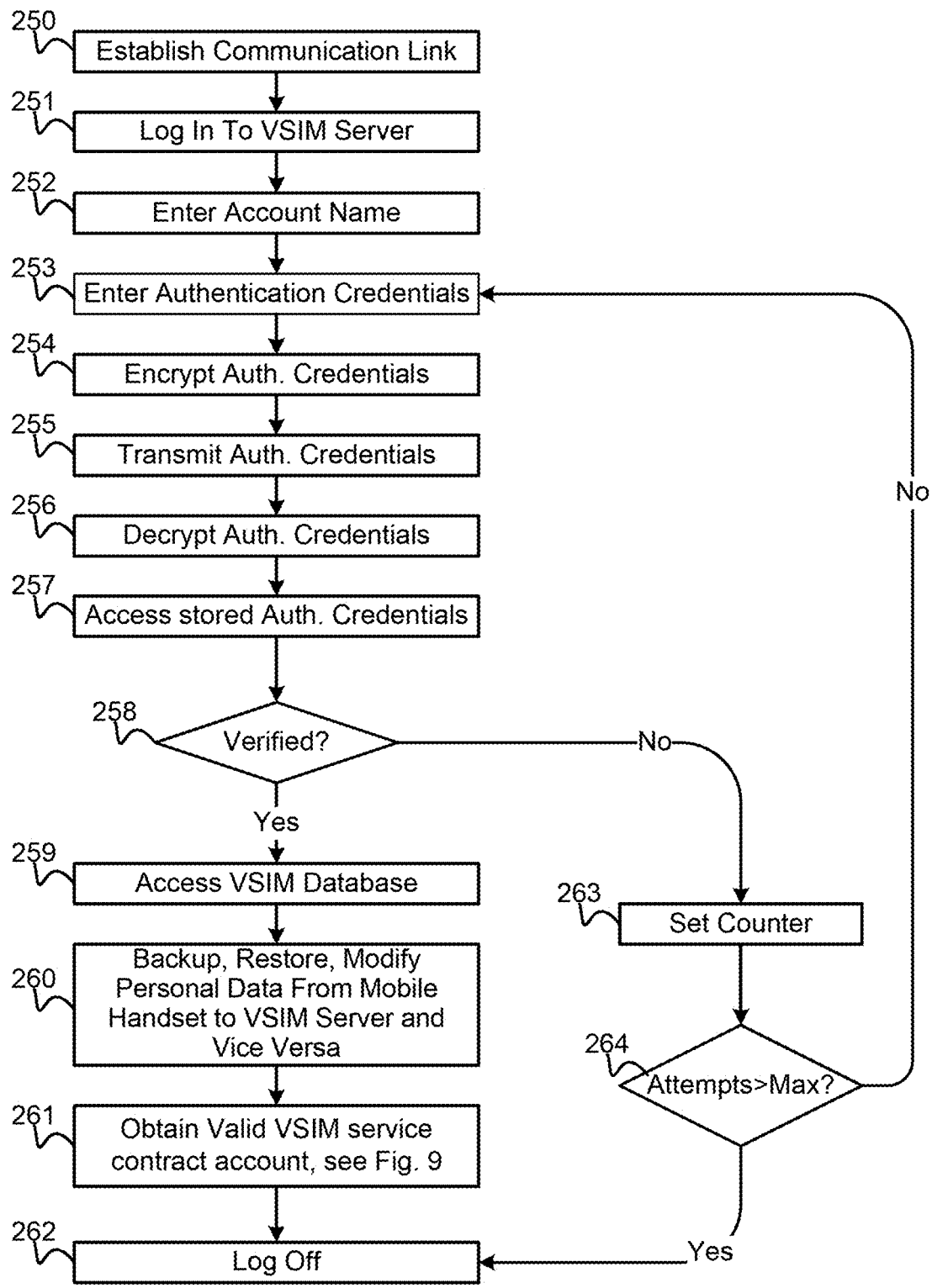
FIG. 11 is a process flow diagram illustrating steps of an alternative embodiment method for obtaining a VSIM service contract as well as personal data stored in a remote VSIM server/database.

FIG. 11 illustrates an overview of a process for purchasing a VSIM service contract and retrieving personal data stored in a VSIM server 130 and/or VSIM database 132 to the mobile device 101*a*. Upon power up of the mobile device 101*a* or any other interval preset by the user or service provider, the mobile device 101*a* establishes a wireless communication link via a cellular telephone network to the VSIM server 130, step 250. Once the communication link has been established, log in to the VSIM server 130 is accomplished, step 251. As part of the login process, the user may be prompted to enter the user's account information via the mobile device 101*a* keyboard, step 252. The account name may be automatically received by the VSIM server 130, such as if the phone number associated with the mobile device 101*a* is used as the user account name. The user may also be prompted to enter authentication credentials, step 253. Any of a number of authentication credential forms may be employed, including password verification, biometric recognition, and combinations thereof. Once entered into the mobile device 101*a*, the authentication credentials are preferably encrypted by the mobile device 101*a* processor and transmitted via the cellular telephone network to the VSIM server 130, step 254, which may transmit the data to the authentication server 131, step 255.

The VSIM server 130 and/or authentication server 131 decrypts the received user account and authentication credential data, step 256. The processor of either the VSIM server 130 or authentication server 131 accesses the stored authentication credentials associated with the user accounts, step 257. The decrypted received authentication credentials are compared to authentication credentials previously stored in the authentication database 133 to authenticate the user and verify that an authorized user is attempting to log in, decision 258. If the authentication credentials match (i.e., decision 258=Yes), the user is authenticated and access is granted to the user account files stored within the VSIM database 130, step 259.

Once access has been granted, the user may upload/backup personal data from the mobile device 101*a* VSIM to the VSIM database 132 via the VSIM server 130, or restore personal data to the mobile device 101*a* memory, step 260. During a backup procedure, personal data is transmitted from the VSIM memory unit 193 of the mobile device 101*a* to the VSIM database 132 via the VSIM server 130. During the restore operation, personal data is transmitted from the VSIM database 132 to the mobile device 101*a* and stored in its VSIM memory unit 193. The user may also perform other operations, such as modifying personal data stored within the VSIM database 132. A data modification procedure may be similar to the backup procedure. So long as access is granted to the user, personal data may flow from the mobile device's 101*a* VSIM memory unit 193 to the VSIM database 132 via the VSIM server 130 and vice versa.

Once the user has completed the desired personal data backup, restore, modify procedures, step 260, the mobile device 101*a* may obtain and use a VSIM service contract account to complete voice and data calls. The mobile device 101*a* may implement the process flow shown in FIG. 9 to allow the user of mobile device 101 to select and purchase a valid VSIM service contract account via a central VSIM server 130, step 261. Once the VSIM service contract provisioning data has been downloaded, the mobile device 101*a* may log off from the VSIM server 130, step 262.

If, when presented, the authentication credentials do not match, the authentication server 131 will deny access to the VSIM database 132 via the VSIM server 130. As shown in FIG. 11, a flag may be set or a count established to record the number of unsuccessful authentication attempts, step 263. If the number of unsuccessful authentication attempts exceeds a preset number (i.e., decision 264=Yes), the user may be logged off by the VSIM server 130, step 262. Otherwise if the number of unsuccessful authentication attempts is less than the preset number (i.e., decision 264=No), the user may be prompted to attempt to authenticate again, step 253. In alternative embodiments, the method may simply allow unlimited authentication attempts, in which case it would not be necessary to perform the initiate counter step 263 or determine if too many attempts had occurred as in decision 264.

As discussed above, to insure quality of service (QOS), service providers may often update the PRL as the mobile device 101 moves within a coverage zone or from one geographic area to another. Because different communication networks operate in different geographic areas it is important to update the selected VSIM service contract PRL to insure that as the mobile device moves into different geographic areas the list of possible communication networks that it may connect to is accurate. The updated VSIM service contract PRL may re-prioritize the listing of available VSIM service contract supported networks or may revise the list to include or remove other networks from the list depending on the current location of the mobile device 101.

As previously discussed with respect to the system table 151 and acquisition table 152 illustrated in FIG. 4, each VSIM service contract service provider maintains a home system communication network (hereinafter referred as the home system). This home system supports wireless communications for the VSIM service contract service provider's customers (users). However, when users travel with their mobile devices outside of the range of the home system, the VSIM service contract providers continue to support wireless communications for the users through the use of roaming partner networks. As discussed above, while a user of a mobile device 101 may purchase a VSIM service contract from a particular service provider, the service provider may have agreements with other service providers to enable its customers to utilize the communication networks of these other service providers (often referred to as roaming partners). When a user is conducting a wireless communication call over the network of one of the other service providers, the user is said to be "roaming." While the user may experience a QOS on the roaming network similar to that of the home system, the user is often charged additional fees for the usage of the roaming partner's network. Accordingly, user may wish to avoid roaming.

By maintaining multiple VSIM service contract accounts on the mobile device's VSIM memory unit 193, a user may quickly enable a new VSIM service contract account that is supported by a home system available to the mobile device 101 in the current location. This may be accomplished by copying provisioning data of the selected new VSIM service contract account into the enabled VSIM provisioning data buffer 314. This swap out of VSIM service contract account data activates the new VSIM service contract account PRL to enable the mobile device 101 to access a home system available in the current location, thereby avoiding roaming fees.

In various embodiments, when a roaming condition is detected the currently enabled VSIM service contract is automatically switched out to a new VSIM service contract that is supported by a home system available to the mobile device in its current location. In some embodiments, the VSIM service contract switch out process may be initiated by the mobile device 101 itself. In other embodiments, the decision to switch out a VSIM service contract on a mobile device may be initiated by a remote VSIM server which receives an indication from the mobile device of its current location. In other embodiments, the remote VSIM server may determine and download an optimal VSIM service contract to a mobile device operating in a particular location.

Figure 12:
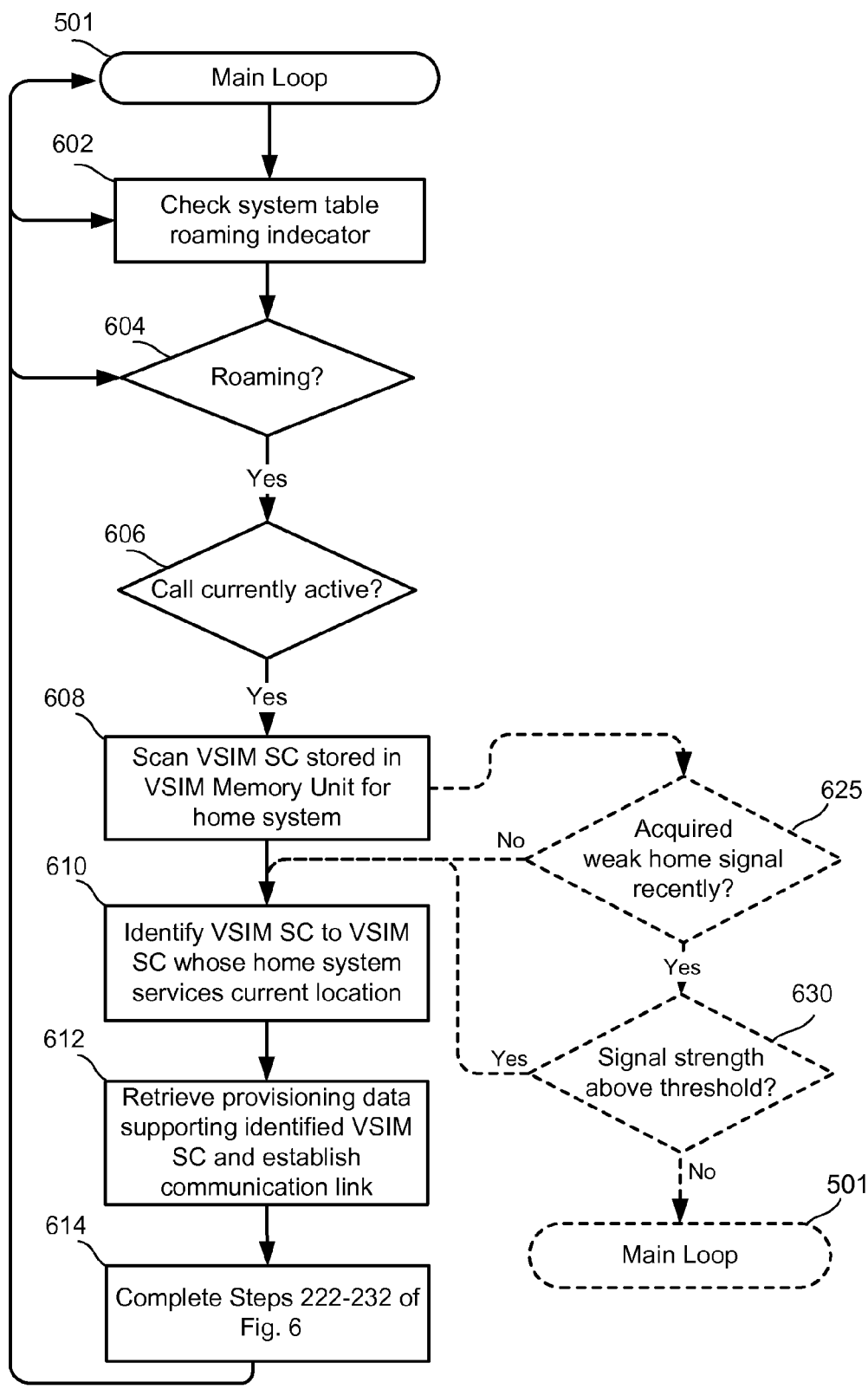
FIG. 12 is a process flow diagram illustrating steps performed in an embodiment which switches the currently enabled VSIM service contract whenever a roaming condition is detected to a VSIM service contract that is supported by a home system available in the mobile device's current location.

FIG. 12 is an exemplary process flow diagram illustrating steps performed in an embodiment which, in response to detecting a roaming condition, automatically switches the currently enabled VSIM service contract to a new VSIM service contract that is supported by a home system available to the mobile device in its current location. This embodiment may be implemented as a routine initiated from the mobile device 101 processor 191 main loop routine 501. A main loop routine 501 may be used to control the various applications and functions of the mobile device 101. At any time (periodic or otherwise) during the running of the main loop 501, the mobile device processor 191 may check the system table 151 of the PRL to determine whether the SID currently in service indicates that the mobile device 101 has established a communication link with the communication network of the home system or one of the roaming partners, step 602. Alternatively, the processor 191 may check a system flag that is set whenever the mobile device is in roaming mode. Based on the results of the roaming indicator of the system table 151, the mobile device processor 191 may determine if the mobile device 101 is roaming, decision 604. If the mobile device 101 is not roaming (i.e., decision 604=No), the mobile device processor 191 returns to the main loop 501. If the processor 191 determines that the mobile device 101 is roaming (i.e., decision 604=Yes), the processor 191 determines if a call is currently active, decision 606. If a call is currently active (i.e., decision 606=Yes), then the mobile device processor 191 may return to the main loop 501. A switch of VSIM service contracts when a call is active would drop the active call. Accordingly, if a call is currently active it is desirable to wait until no call is active before switching out a VSIM service contract. If, however, a call is not currently active (i.e., decision 606=No), then the mobile device processor 191 may scan all available VSIM service contracts stored in the VSIM memory unit 193 for a VSIM service contract whose home system is available to the mobile device 101 in its current location, step 608. Presumably if a VSIM service contract's home system is available to the mobile device 101 in the current location, activation of that VSIM service contract will allow the user to conduct wireless communication calls without incurring roaming fees. One of skill in the art would appreciate that the order of steps 602-606 is arbitrary.

After scanning all available VSIM service contracts stored in the VSIM memory unit 193, any VSIM service contracts whose home systems is available to the mobile device 101 in its current location is identified, step 610. Once the appropriate VSIM service contract is identified, the provisioning data supporting the identified VSIM service contract is retrieved from the VSIM memory unit 193 and loaded into a VSIM provisioning data buffer 314 (see FIG. 7) and a communication link is established with the home system supporting the VSIM service contract, step 612. Alternatively instructions directing the mobile device processor 191 to the memory location storing the corresponding provisioning data via a pointer list may be issued, and a communication link is established with the home system supporting the VSIM service contract, step 612

In the event that multiple VSIM service contracts are identified, a hierarchical priority order may be implemented to determine which VSIM service contract should be switched in. For example, if multiple VSIM service contracts whose home systems are available in the mobile device's 101 current location, then the VSIM service contract that was downloaded most recently (or least recently) may be switched in first. Other criteria may be used to determine the priority order, such as which VSIM service contract provides the cheapest rate, has the most minutes left, provides the best QoS, etc. If a connection to the highest priority VSIM service contract's home system is not possible for some reason, the next highest priority VSIM service contract can be switched in, and so on until a connection to a home system network is complete.

Once a communication link is made with the appropriate home system network, the mobile device processor 191 may complete steps 222-232 of FIG. 6 described above to complete the communication call, step 614. Once the communication call is complete, the mobile device processor 191 may return to the main loop 501.

In an alternative embodiment, additional optional steps 625 and 630 may be added to the process flow shown in FIG. 12 which prevent a ping-pong situation between two or more home system networks. The process of switching VSIM service contract accounts takes time and potentially puts the mobile device in an out of service condition for the duration of time it takes to switch VSIM service contract accounts. If the mobile device 101 is located in a geographic location which is on the border of two or more home system networks, the situation may trigger continual and frequent switching of VSIM service contract accounts. Such continual and frequent switching VSIM service contract account is sometimes colloquially referred to as "ping-ponging" between home systems. For example, at the edge of two or more VSIM service contract home system, the mobile device 101 may continually enter and leave the range of a home system. In order to avoid the time and power consuming process of switching VSIM service contract accounts, the mobile device 101 can apply additional delays or other heuristics in making switches. As a result, the mobile device 101 will remain active on a single home system for a longer period of time. For example, if the mobile device detects a weak home system signal and the signal has been dropped recently, mobile device 101 may delay the switch until the signal is stronger than default threshold. As shown in FIG. 12, after scanning all available VSIM service contracts stored in the VSIM memory unit 193 for a VSIM service contract whose home system is available to the mobile device 101 in its current location, step 608, the processor may optionally determine if the processor 191 has recently acquired a weak home system signal, decision 625. A record of time between home system acquisitions may be recorded in a memory buffer to determine how long the home system has been acquired. If the duration of time stored in the memory buffer does not exceed a pre-determined threshold value, the home system may be deemed to be recently acquired. If the processor 191 has not recently acquired a weak home system signal (i.e., decision 625=No), then the processor 191 identifies any VSIM service contract whose home system is available to the mobile device 101 in its current location, step 610. The processor 191 then continues on with steps 612 and 614 as described above.

If however, the processor 191 determines that a home system signal has been recently acquired and dropped (i.e., decision 625=Yes), then the processor 191 continues to determine if the newly acquired home system has a stronger signal strength than a threshold limit, decision 630. If the newly acquired home system signal strength does not exceed a threshold limit (i.e., decision 630=No), then the processor 191 returns to the main loop 501. If however, the signal strength does exceed a threshold limit (i.e., decision 630=Yes), then the processor continues to identify any VSIM service contract whose home system is available to the mobile device 101 in its current location, step 610. The processor 191 then continues on with steps 612 and 614 as described above.

Figure 13:
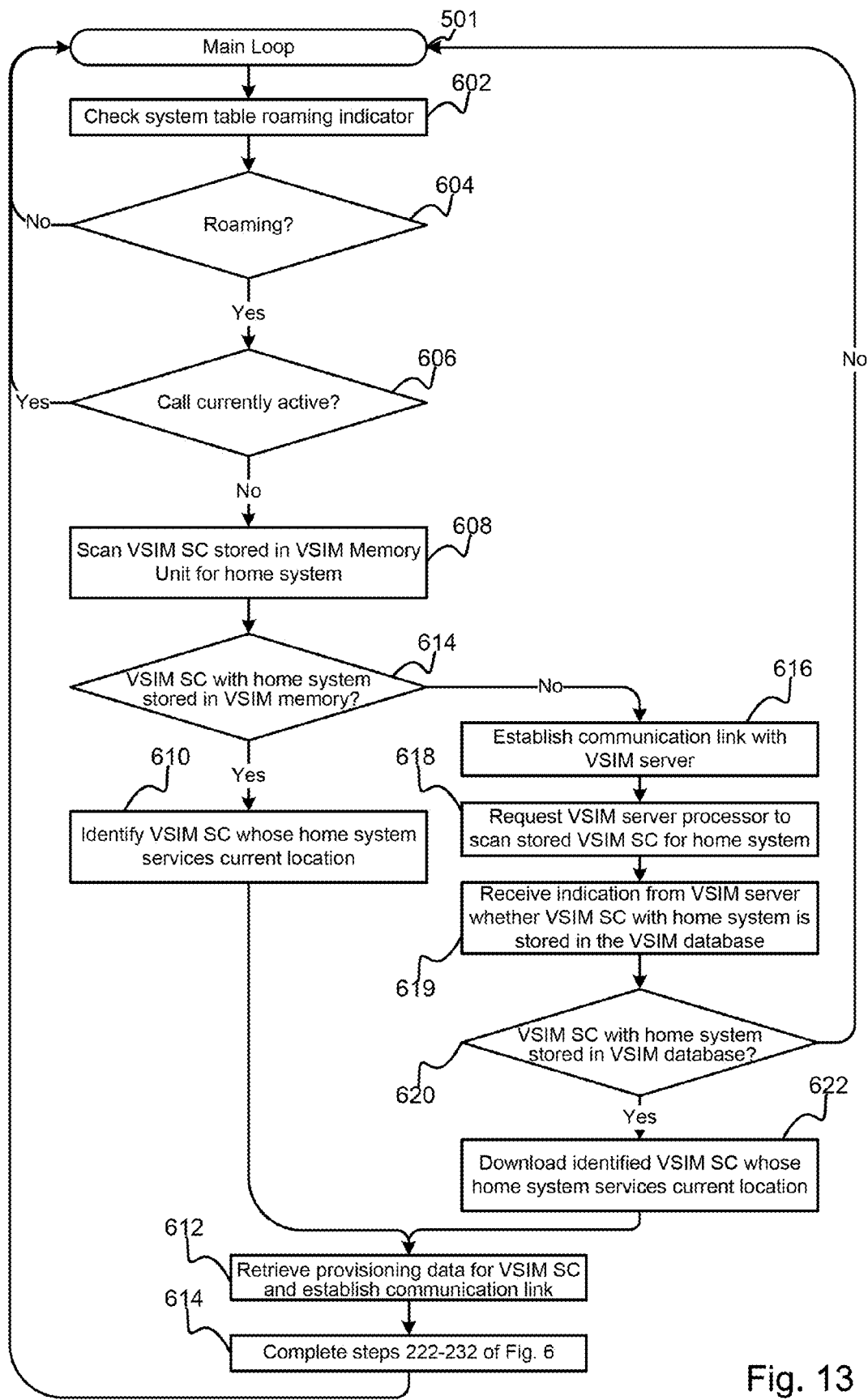
FIG. 13 is a process flow diagram illustrating steps performed in an alternative embodiment which switches the currently enabled VSIM service contract whenever a roaming condition is detected to a VSIM service contract that is supported by a home system available in the mobile device's current location.

FIG. 13 is an exemplary process flow diagram illustrating steps performed in an alternative embodiment which not only switches the currently enabled VSIM service contract to a new VSIM service contract whenever a roaming condition is detected, but also downloads a VSIM service contract that is supported by a home system available to the mobile device in its current location if one is not already stored in the VSIM memory unit 193. As with the embodiment described above with reference to FIG. 12, the mobile device processor 191 starts in the main loop routine 501 and performs steps 602-608. After the scan of all VSIM service contracts stored in the VSIM memory unit 193, the mobile device processor 191 determines whether a VSIM service contract whose home system is available to the mobile device 101 in its current location is stored in the VSIM memory unit 193, decision 614. If such a VSIM service contract is already stored in the VSIM memory unit 193 (i.e., decision 614=Yes), then the mobile device processor 191 completes steps 610-614 as described above with reference to FIG. 12.

However, if such a VSIM service contract has not been previously stored in the VSIM memory unit 193 (i.e., decision 614=No), then a communication link may be established with a VSIM server (110, 130), step 616. In addition, a communication link may be established with any VSIM server (102-105) so long as the VSIM server supports a VSIM database that contains a VSIM service contract whose home system is available to the mobile device 101 in its current location. Once the communication link to the VSIM server is established, the mobile device processor 191 may transmit a service request to the VSIM server (102-105) requesting the server processor to scan the various VSIM service contracts available through the VSIM server to identify a VSIM service contract whose home system is available to the mobile device 101 in its current location, step 618. After the scan is completed by the VSIM server processor, the VSIM server (102-105, 110, 130) returns a response to the mobile device 101 indicating whether the scan identified a VSIM service contract stored on any of the VSIM databases supported by the VSIM server whose home system is available to the mobile device 101 in its current location. This response message from the VSIM server is received by the mobile device 101, step 619. Based upon this received message, the mobile device processor 191 determines if any VSIM service contracts exists in any of the VSIM databases (106-109) serviced by the VSIM server (102-105, 110, 130), decision 620. If the received message indicates that no VSIM service contracts exist in any of the VSIM databases (106-109) (i.e., decision 620=No), the mobile device processor 191 may return to main loop 501 which will result in the mobile device remaining in the roaming mode so the next check of the roaming indicator, step 602, will cause the test loop to repeat (i.e., decision 604=Yes). In instances where the mobile device 101 has continued to move locations, the roaming condition may cease when it moves into a home system thereby negating the need to switch VSIM service contracts. Alternatively, the VSIM switching process shown in FIG. 13 may be repeated and contact may be made to a different VSIM server in step 616 to provide the mobile device 101 with access to other VSIM databases containing alternative VSIM service contracts.

If, however, the response message received from the VSIM server (102-105, 110, 130) indicates that a VSIM service contract whose home system is available in the current location of the mobile device 101 is stored on one of the VSIM databases (106-109) serviced by the VSIM server (102-105, 110, 130) (i.e., decision 620=Yes), the mobile device processor 191 sends a request to the VSIM server (102-105, 110, 130) requesting it to download the identified VSIM service contract (and its respective provisioning data) to the VSIM memory unit 193 of the mobile device 101, step 622. In the event that multiple VSIM service contracts are identified, a hierarchical priority order may be implemented by the VSIM server (102-105, 110, 130,) processor to determine which of the multiple VSIM service contracts should be identified for download. For example, if there are multiple VSIM service contracts whose home systems are available in the mobile device's 101 current location, then the VSIM service contract that is cheapest may be selected for download. Other criteria could be used to select the appropriate VSIM service contract may include the VSIM service contract that provides the best QoS, or widest network range, etc. Once the download is complete, the provisioning data of the downloaded VSIM service contract may be loaded into a VSIM provisioning data buffer 314 (see FIG. 7) or instructions directing the mobile device processor 191 to the memory location storing the corresponding provisioning data via a pointer list may be issued, and a communication link established with the home system supporting the VSIM service contract, step 612. Once a communication link is made with the appropriate home system network, the mobile device processor 191 completes steps 222-232 of FIG. 6 described above to complete a communication call, step 614.

Figure 14:
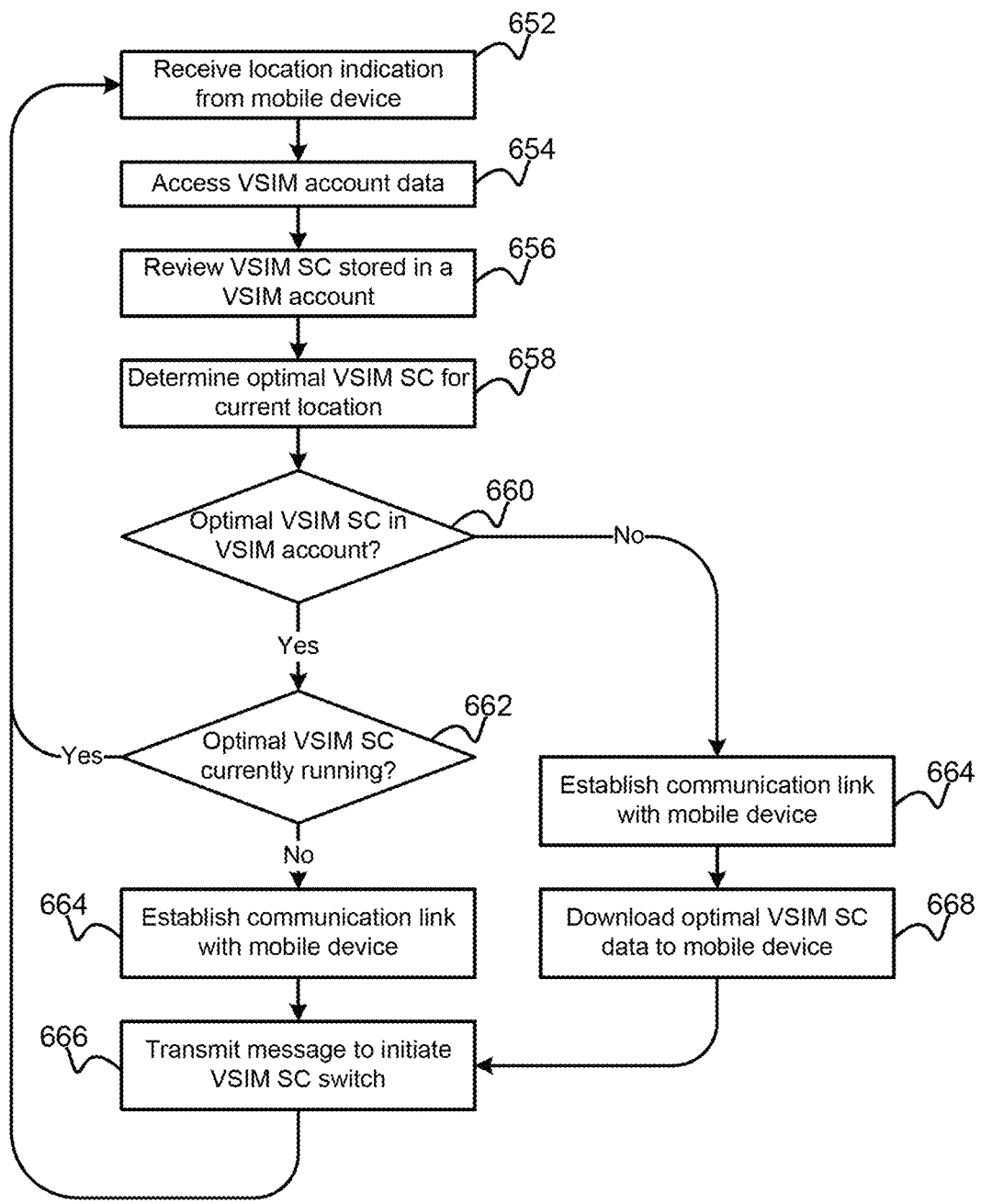
FIG. 14 is a process flow diagram illustrating steps performed by a remote server in an alternative embodiment where the decision to switch a VSIM service contract in response to a roaming condition may be made by a remote server processor.

In another alternative embodiment, the decision to switch a VSIM service contract in response to a roaming condition may be made by a remote server but the switching procedure may be implemented by the mobile device. FIG. 14 is a process flow diagram illustrating the steps performed by a remote server in this alternative embodiment. The VSIM server (102-105, 110, 130) may receive at any time (periodic or otherwise) via a network a message from a mobile device 101 reporting its current location, step 652. The message reporting the mobile device's location may also contain data identifying the specific mobile device 101, the VSIM service contract currently enabled on the mobile device 101, and its corresponding VSIM account data stored in the VSIM server/database (130/132). The VSIM server (102-105, 110, 130) may also determine the currently enabled VSIM server contract based upon the network through which the server received the location reporting message. Based upon the received information, the VSIM server (102-105, 110, 130) may access the corresponding VSIM account stored in the VSIM server/database 130/132, step 654. By accessing the corresponding VSIM account, the VSIM server (102-105, 110, 130) processor may inventory the various VSIM service contracts downloaded by the user and stored in the VSIM memory unit 193, step 656. Once the inventory of VSIM service contracts is taken, the VSIM server (102-105, 110, 130) processor may determine the optimal VSIM service contract to implement in the current location of the mobile device 101, step 658. The VSIM server (102-105, 110, 130) processor may determine an optimal VSIM service contract based upon which VSIM service contract is the most cost efficient operating in the current location of the mobile device 101, for example. In other embodiments, the VSIM server (102-105, 110, 130) processor may determine an optimal VSIM service contract based upon which VSIM service contract provides the best QoS or widest ranging network that encompasses the mobile device's 101 current location. Other criteria may be used to determine the optimal VSIM service contract.

Once the optimal VSIM service contract is determined, the VSIM server (102-105, 110, 130) processor determines if the optimal VSIM service contract exists in the user's VSIM account (i.e., whether the user previously purchased and downloaded the determined optimal VSIM service contract), decision 660. If the determined optimal VSIM service contract exists in the user's VSIM account (i.e., decision 660=Yes), the VSIM server (102-105, 110, 130) processor determines if the optimal VSIM service contract is currently enabled on the mobile device 101, decision 662. This determination may be made based upon the data received from the mobile device 101 indicating which VSIM service contract is currently enabled.

If the optimal VSIM service contract is currently enabled on the mobile device 101 (i.e., decision 662=Yes), then no VSIM service contract switching is necessary and the VSIM server (102-105, 110, 130) processor may await the next location report from another mobile device. However, if the optimal VSIM service contract is not currently enabled on the mobile device 101 (i.e., decision 662=No), then the VSIM server (102-105, 110, 130) processor may establish a communication link with the mobile device 101, step 664. Once the communication link is established, the VSIM server processor may transmit an instruction message to the mobile device 101 to retrieve and implement the provisioning data supporting the identified optimal VSIM service contract, steps 612 and 614 shown in FIGS. 12 and 13 and described above (see also FIG. 16), step 666. Once the instruction message to initiate a VSIM service contract switch has been sent the VSIM server (102-105, 110, 130) processor may await the next location report from another mobile device.

If the determined optimal VSIM service contract does not exist in the corresponding VSIM account (i.e., decision 660=No), the VSIM server (102-105, 110, 130) processor may establish a communication link with the mobile device 101, step 664, and download the optimal VSIM service contract data (including provisioning data) to the mobile device 101 and establish the VSIM service contract account in the corresponding VSIM account, step 668. Once the new optimal VSIM service contract data has been successfully downloaded to the mobile device 101, the VSIM server (102-105, 110, 130) processor may transmit an instruction message to the mobile device 101 to retrieve and implement the provisioning data supporting the identified optimal VSIM service contract, steps 612 and 614 shown in FIGS. 12 and 13 and described above (see also FIG. 17), step 666. Once the instruction message to initiate a VSIM service contract switch has been sent the VSIM server (102-105, 110, 130) processor may await the next location update from another mobile device.

Figure 15:
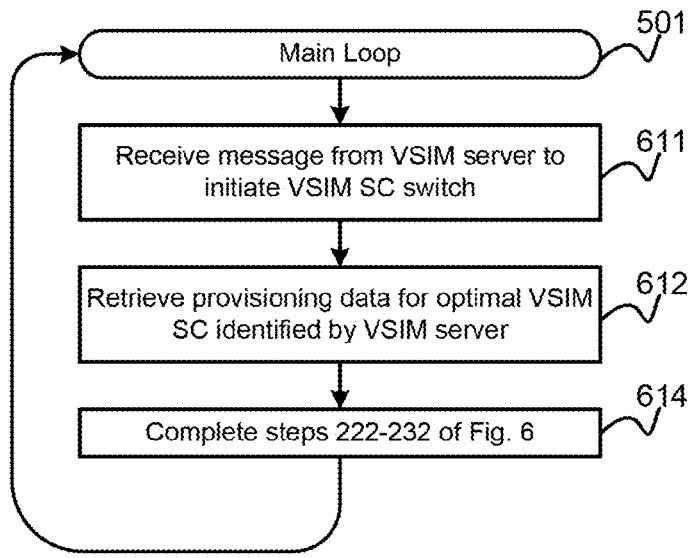
FIG. 15 is a process flow diagram illustrating steps in an embodiment taken by a mobile device processor in response to receiving a message from the VSIM server processor to initiate a VSIM service contract switch

FIG. 15 is a process flow diagram illustrating the steps taken by a mobile device processor 191 in response to receiving a message from the VSIM server processor to initiate a VSIM service contract switch consistent with the embodiment illustrated in FIG. 14 and described above. At any time during the running of the main loop 501, the mobile device processor 191 may receive an instruction message from the VSIM server to initiate a VSIM service contract switch, step 611. Upon receipt of such an instruction message, the mobile device processor 191 may retrieve the provisioning data for the optimal VSIM service contract identified by the VSIM server in the received message, step 612, and then complete steps 222-232 described above with reference to FIG. 6 to complete a communication call, step 614. Once the communication call is complete, the mobile device processor 191 may return to the main loop 501.

Figure 16:
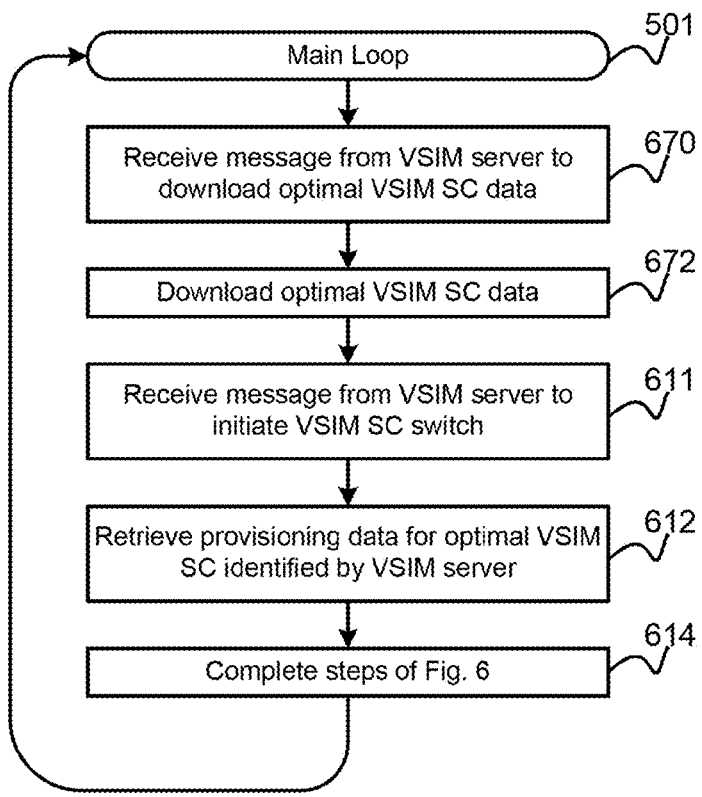
FIG. 16 is a process flow diagram illustrating steps in an embodiment taken by a mobile device processor in response to receiving a message from the VSIM server processor to download a new optimal VSIM service contract and initiate a VSIM service contract switch.

FIG. 16 is a process flow diagram illustrating the steps taken by a mobile device processor 191 in response to receiving a message from the VSIM server processor to download a new optimal VSIM service contract and initiate a VSIM service contract switch consistent with the embodiment described above with reference to FIG. 14. At any time during the running of the main loop 501, the mobile device processor 191 may receive an instruction message from the VSIM server to download VSIM service contract data for an optimal VSIM service contract identified by the VSIM server, step 670. In response, the mobile device 191 downloads the optimal VSIM service contract data from the VSIM server 130 to the VSIM memory unit 193, step 672. Once the download of the new optimal VSIM service contract data is complete, the mobile device processor 191 may receive an instruction message from the VSIM server 130 to initiate a VSIM service contract switch, step 611. Upon receiving such an instruction message, the mobile device processor 191 may retrieve the provisioning data for the optimal VSIM service contract identified by the VSIM server in the received message, step 612, and complete steps 222-232 described above with reference to FIG. 6 to complete a communication call, step 614. Once the communication call is complete, the mobile device processor 191 may return to the main loop 501.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order.

The hardware used to implement the foregoing embodiments may be processing elements and memory elements configured to execute a set of instructions, including microprocessor units, microcomputer units, programmable floating point gate arrays (FPGA), and application specific integrated circuits (ASIC) as would be appreciated by one of skill in the art, wherein the set of instructions are for performing method steps corresponding to the above methods. Alternatively, some steps or methods may be performed by circuitry that is specific to a given function.

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. The software module may reside in a processor readable storage medium and/or processor readable memory both of which may be any of RAM memory, flash memory, ROM memory, EPROM memory, EEPROM memory, registers, hard disk, a removable disk, a CD-ROM, or any other tangible form of data storage medium known in the art. Moreover, the processor readable memory may comprise more than one memory chip, memory internal to the processor chip, in separate memory chips, and combinations of different types of memory such as flash memory and RAM memory. References herein to the memory of a mobile handset are intended to encompass any one or all memory modules within the mobile handset without limitation to a particular configuration, type or packaging. An exemplary storage medium is coupled to a processor in either the mobile handset or the theme server such that the processor can read information from, and write information to, the storage medium. In the alternative, the storage medium may be integral to the processor. The processor and the storage medium may reside in an ASIC.

The foregoing description of the various embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, and instead the claims should be accorded the widest scope consistent with the principles and novel features disclosed herein.

We claim:

1. A method for supporting a wireless communication call on a mobile device having a VSIM (Visual Subscriber Indentity Module) internal memory unit having stored therein provisioning data for a first plurality of service contracts, comprising:
   determining whether the mobile device is currently roaming;
   determining whether the mobile device is currently conducting a wireless communication call; and
   enabling access to a new home system that is currently available to the mobile device when the mobile device is currently roaming and not currently conducting a wireless communication call, wherein enabling access to a new home system comprises:
   identifying all new home systems operating in a current location of the mobile device, wherein each home system supports a second plurality of service contracts;
   receiving a selection of one of the second plurality of service contracts supported by an identified new home system operating in the current location of the mobile device;
   retrieving provisioning data corresponding to the selected one of the second plurality of service contracts supported by the identified new home system;
   copying the provisioning data for the selected one of the second plurality of service contracts supported by the identified new home system into an enabled VSIM provisioning data buffer, wherein the provisioning data includes acquisition parameters for communication networks associated with the identified new home system; and
   establishing a communication link to the identified new home system using the retrieved provisioning data.

2. The method of claim 1, further comprising:
   establishing a communication link with a remote server if the second plurality of service contracts supported by the identified new home system is not a subset of the first plurality of service contracts stored in the VSIM internal memory unit; and
   downloading provisioning data of the selected one of the second plurality of service contracts to the mobile device, wherein the provisioning data is downloaded from a remote database accessible by the remote server.

3. The method of claim 2, further comprising:
   scanning a plurality of remote databases to identify the second plurality of service contracts supported by the identified new home system.

4. The method of claim 1, further comprising:
   receiving from a remote server a message to retrieve the provisioning data corresponding to the selected one of the second plurality of service contracts supported by the identified new home system.

5. The method of claim 4, wherein:
   the second plurality of service contracts supported by the identified new home system is not a subset of the first plurality of service contracts;
   the message to retrieve the provisioning data corresponding to the selected one of the second plurality of service contracts comprises a download instruction; and
   the provisioning data corresponding to the selected one of the second plurality of service contracts is downloaded in response to the download instruction.

6. A mobile device comprising:
   means for storing provisioning data for a first plurality of service contracts in a VSIM (Virtual Subscriber Identity Module) internal memory unit;
   means for determining whether the mobile device is currently roaming;
   means for determining whether the mobile device is currently conducting a wireless communication call; and
   means for enabling access to a new home system that is currently available to the mobile device when the mobile device is currently roaming and not currently conducting a wireless communication call, wherein means for enabling access to a new home system comprises:
   means for identifying all new home systems operating in a current location of the mobile device, wherein each home system supports a second plurality of service contracts;
   means for receiving a selection of one of the second plurality of service contracts supported by an identified new home system operating in the current location of the mobile device;
   means for retrieving provisioning data corresponding to the selected one of the second plurality of service contracts;
   means for copying the provisioning data for the selected one of the second plurality of service contracts into an enabled VSIM provisioning data buffer, wherein the provisioning data includes acquisition parameters for communication networks associated with the identified new home system; and
   means for establishing a communication link to the identified new home system using the retrieved provisioning data.

7. The mobile device of claim 6, further comprising:
   establishing a communication link with a remote server if the second plurality of service contracts supported by the identified new home system is not a subset of the first plurality of service contracts stored in the VSIM internal memory unit; and
   means for downloading and storing provisioning data of the selected one of the second plurality of service contracts, wherein the provisioning data is downloaded from a remote database accessible by the remote server.

8. The mobile device of claim 6, further comprising:
means for receiving from a remote server a message to retrieve the provisioning data corresponding to the selected one of the second plurality of service contracts supported by the identified new home system.

9. The mobile device of claim 8, wherein:
the second plurality of service contracts supported by the identified new home system is not a subset of the first plurality of service contracts;
the message to retrieve the provisioning data corresponding to the selected one of the second plurality of service contracts comprises a download instruction; and
the provisioning data corresponding to the selected one of the second plurality of service contracts is downloaded in response to the download instruction.

10. A mobile device, comprising: a processor;
an internal memory unit coupled to the processor, the internal memory unit having stored thereon provisioning data for a first plurality of service contracts within a VSIM (Virtual Subscriber Identity Module) memory unit; and
a wireless communication transceiver coupled to the processor,
wherein the processor is configured with processor-executable instructions to perform steps comprising:
determining whether the mobile device is currently roaming;
determining whether the mobile device is currently conducting a wireless communication call; and
enabling access to a new home system that is currently available to the mobile device when the mobile device is currently roaming and not currently conducting a wireless communication call, wherein enabling access to a new home system comprises:
identifying all new home systems operating in a current location of the mobile device, wherein each home system supports a second plurality of service contracts;
receiving a selection of one of the second plurality of service contracts supported by an identified new home system operating in the current location of the mobile device;
retrieving provisioning data corresponding to the selected one of the second plurality of service contracts;
copying the provisioning data for the selected one of the second plurality of service contracts into an enabled VSIM provisioning data buffer, wherein the provisioning data includes acquisition parameters for communication networks associated with the identified new home system; and
establishing a communication link via the wireless communication transceiver to the identified new home system using the retrieved provisioning data.

11. The mobile device of claim 10, wherein the processor is further configured with processor-executable instructions to perform steps further comprising:
establishing a communication link via the wireless communication transceiver with a remote server if the second plurality of service contracts supported by the identified new home system is not a subset of the first plurality of service contracts stored in the VSIM memory unit; and
downloading provisioning data of the selected one of the second plurality of service contracts to the mobile device, wherein the provisioning data is downloaded from a remote database accessible by the remote server.

12. The mobile device of claim 10, wherein the processor is further configured with processor-executable instructions to perform steps further comprising:
receiving from a remote server a message to retrieve provisioning data corresponding to the selected one of the second plurality of service contracts supported by the identified new home system.

13. The mobile device of claim 12, wherein:
the second plurality of service contracts supported by the identified new home system is not a subset of the first plurality of service contracts;
the message to retrieve the provisioning data corresponding to the selected one of the second plurality of service contracts comprises a download instruction; and
the provisioning data corresponding to the selected one of the second plurality of service contracts is downloaded in response to the download instruction.

14. A non-transitory computer-readable storage medium having stored thereon processor-executable instructions configured to cause a processor of a mobile device to perform steps comprising:
determining whether the mobile device having a VSIM (Virtual Subscriber Identity Module) internal memory unit having stored therein provisioning data for a first plurality of service contracts is currently roaming;
determining whether the mobile device is currently conducting a wireless communication call; and
enabling access to a new home system that is currently available to the mobile device when the mobile device is currently roaming and not currently conducting a wireless communication call, wherein enabling access to a new home system comprises:
identifying all new home systems operating in a current location of the mobile device, wherein each home system supports a second plurality of service contracts;
receiving a selection of one of the second plurality of service contracts supported by an identified new home system operating in the current location of the mobile device;
retrieving provisioning data corresponding to the selected one of the second plurality of service contracts;
copying the provisioning data for the selected one of the second plurality of service contracts into an enabled VSIM provisioning data buffer, wherein the provisioning data includes acquisition parameters for communication networks associated with the identified new home system; and
establishing a communication link to the identified new home system using the retrieved provisioning data.

15. The non-transitory computer-readable storage medium of claim 14, wherein the stored processor-executable instructions are configured to cause the processor of the mobile device to perform further steps comprising:
establishing a communication link with a remote server if the second plurality of service contracts supported by the identified new home system is not a subset of the first plurality of service contracts stored in the VSIM internal memory unit; and
downloading provisioning data of the selected one of the second plurality of service contracts to the mobile device, wherein the provisioning data is downloaded from a remote database accessible by the remote server.

16. The non-transitory computer-readable storage medium of claim 15, wherein the stored processor-executable instructions are configured to cause the processor of the mobile device to perform further steps comprising:

transmitting a request to the remote server to scan a plurality of remote databases to identify the second plurality of service contracts supported by the identified new home system.

17. The non-transitory computer-readable storage medium of claim 14, wherein the stored processor-executable instructions are configured to cause the processor of the mobile device to perform further steps comprising:
receiving a message to retrieve the provisioning data corresponding to the selected one of the second plurality of service contracts supported by the identified new home system.

18. The non-transitory computer-readable storage medium of claim 17, wherein the stored processor-executable instructions are configured such that:
the second plurality of service contracts supported by the identified new home system is not a subset of the first plurality of service contracts;
the message to retrieve the provisioning data corresponding to the selected one of the second plurality of service contracts comprises a download instruction; and
the provisioning data corresponding to the selected one of the second plurality of service contracts is downloaded in response to the download instruction.

\* \* \* \* \*